United States Patent [19]

Watari et al.

[11] Patent Number: 4,592,086

[45] Date of Patent: May 27, 1986

[54] CONTINUOUS SPEECH RECOGNITION SYSTEM

[75] Inventors: Masao Watari; Hiroaki Sakoe, both of Tokyo, Japan

[73] Assignee: Nippon Electric Co., Ltd., Tokyo, Japan

[21] Appl. No.: 447,829

[22] Filed: Dec. 8, 1982

[30] Foreign Application Priority Data

Dec. 9, 1981 [JP] Japan .............................. 56-197841
Dec. 23, 1981 [JP] Japan .............................. 56-208791

[51] Int. Cl.⁴ .............................................. G10L 1/00
[52] U.S. Cl. ..................................................... 381/43
[58] Field of Search ................................... 381/42–45; 382/33, 34, 37

[56] References Cited

U.S. PATENT DOCUMENTS 4,286,115  8/1981  Sakoe .................................. 381/43

OTHER PUBLICATIONS

Myers et al., "Level Building Dynamic Time Warping Algorithm etc.," IEEE Trans. on Acoustics, etc., Apr. 1981, pp. 284–297.

Primary Examiner—E. S. Matt Kemeny
Attorney, Agent, or Firm—Sughrue, Mion, Zinn, Macpeak & Seas

[57] ABSTRACT

A continuous speech recognition system determines the similarity between input patterns and reference patterns over time such that similarities between previously spoken speech patterns and reference patterns are determined while speech continues to be spoken. Degrees of dissimilarity at arbitrary reference pattern word times are determined asymptotically and are recorded. The minimum degree of dissimilarity is determined and the corresponding word is categorized. Recognition decisions are ultimately made in reverse chronological order.

23 Claims, 22 Drawing Figures

FIG. IIA
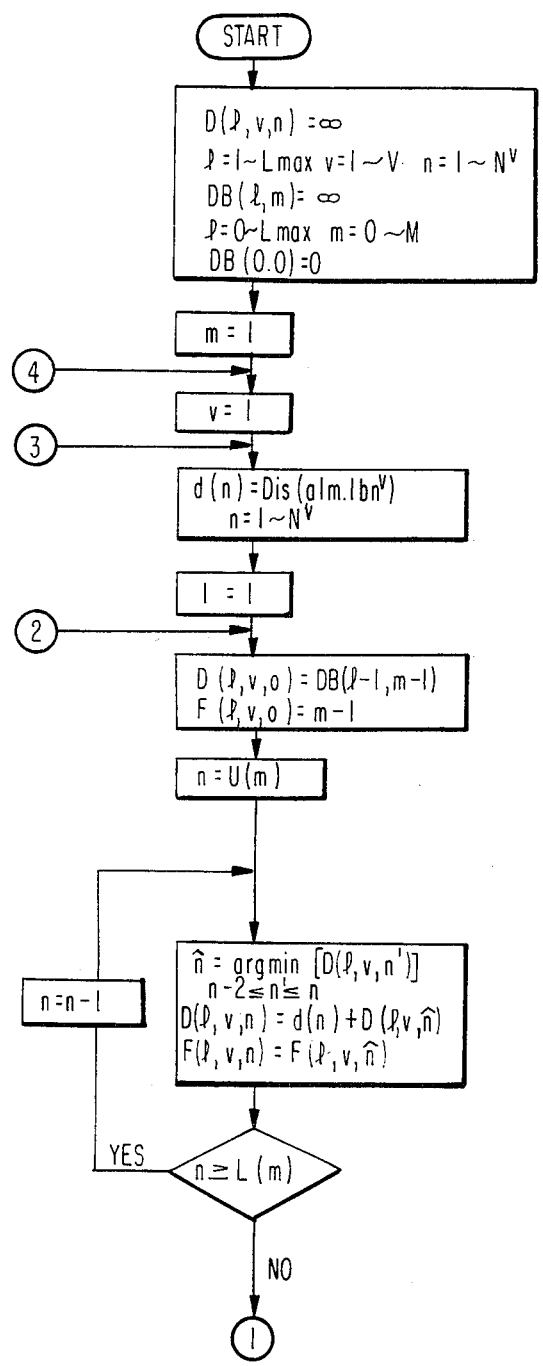

FIG. 15
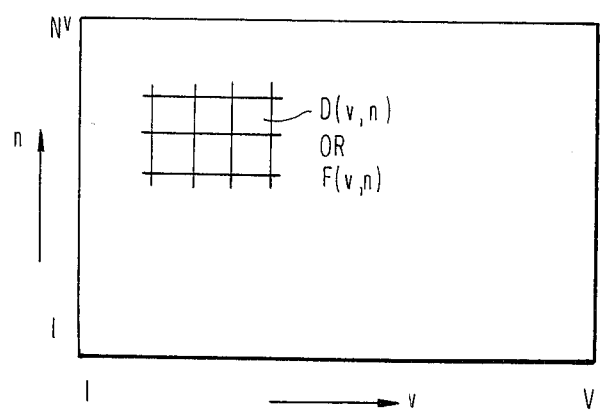
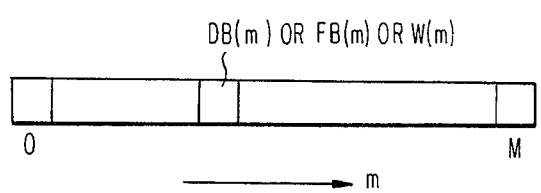
FIG. 16

CONTINUOUS SPEECH RECOGNITION SYSTEM

BACKGROUND OF THE INVENTION

This invention relates to a system for automatically recognizing continuous speech composed of a plurality of words spoken continuously.

Various methods have been tried hitherto for voice recognition. A simple pattern matching method which is both available and effective will be described below. This method measures the degree of dissimilarity (hereinafter called "similarity measure") between a reference pattern (hereinafter called "reference word pattern") prepared for each word to be recognized and an inputted unknown voice pattern (hereinafter called "input pattern"), thereby recognizing the input pattern as a word of the reference work pattern when the similarity measure is minimized.

A continuous speech recognition system operating according to the above-mentioned pattern matching method has been proposed in the U.S. Pat. No. 4,059,725. This system operates by matching a reference pattern of a continuous voice (hereinafter called "reference continuous voice pattern") obtained through connecting several reference word patterns in every order with the whole input pattern. The recognition is performed by specifying the number and order of the reference word patterns so that the whole similarity measure will be minimized. The above-mentioned minimization is divided practically into two stages those which minimized at a word unit level and those which minimize at a whole pattern level, and each minimization is carried out according to a dynamic programming (the matching using dynamic programming being called "DP matching" hereinafter.)

In minimization at a word unit level, the system divides the input pattern at every conceivable word unit and then performs DP matching with the reference word pattern for all of them. Assuming here that the length of the input pattern is M and that the number of reference word patterns is V, DP matching will be required M.V times.

A technique for reducing the above number of DP matchings to Lmax.V with one word being one digit and the maximum available digit number being Lmax has been proposed by Cory S. Myers and Lawrence R. Rabinar. Reference is made to a paper "A Level Building Dynamic Time Warping Algorithm for Connected Word Recognition" IEEE TRANSACTIONS ON ACOUSTICS, SPEECH, AND PROCESSING, VOL. ASSP-29, No. 2, APRIL 1981, pp. 284-297. According to this technique, the similarity measure between the input pattern, given in a time series of feature vectors, and the reference continuous voice pattern, given in every combination of pluralities of words, each comprising a time series of feature vectors, will be obtained as follows. A time point m of the input pattern and a time point n of the reference continuous voice pattern are made to correspond with each other by a well-known optimum monotony increased nonlinear function (hereinafter called "time normalized function") $n=n(m)$, and the accumulated value of the distance $d(m, n)$ between feature vectors at the time is thus made corresponding along the time normalized function as the minimum similarity measure. A minimum value of the whole similarity measure obtainable along all matching routes passing a given point is given generally by the sum of minimum values of a partial similarity measure from the start to the given point and a partial similarity measure from the given point to the end. Now, therefore, regarding an end point on each digit of the reference continuous voice pattern as the foregoing given point, a minimum partial similarity measure may be obtained on each digit, and the mimimum whole similarity measure may be obtained by summing the minimum partial similarity measure for all digits. Namely, each reference word pattern on the first digit of the reference continuous voice pattern is subjected first to a matching with the input pattern to obtain a minimum value of the similarity measure, and then the result works as an initial value for the matching of the second digit to carry out a matching of each reference word pattern on the second digit with the input pattern. After matching as far as the Lmax-th digit, a minimum value of the similarity measure on each digit at an end point M of the input pattern is obtained, thus obtaining an optimum digit number L. A recognition category for each digit is obtained successively by following backwardly the matching path from a point of a similarity measure on the L-th digit.

Minimization is effected on each digit of the reference continuous voice pattern, as described above, according to the technique given by Myers et al., therefore the number of DP matching process for each digit is equal to the reference word number V, thereby reducing the number of the whole DP matching process to Lmax.V.

In a speech recognition system, a recognition response takes place in the time from the end of speech being detected to a recognized result being outputted. Then, according to the technique by Myers et al., a matching on the first digit is commenced after the input pattern necessary for matching on the first digit is obtained, and the matching follows successively up to the Lmax-th digit, thus obtaining a recognized result. In other words, a calculation for DP matching proceeds in the input pattern axis direction in the above technique, therefore a major part of the calculation cannot be commenced until the input voice comes to an end. For example, assuming the upper boundary of a range for matching (or well-known matching window) specified by a straight line of inclination 2, the lower boundary specified by a straight line of inclination ½ and the maximum length or reference pattern doubled as an average length of reference pattern, the calculation for the matching process only proceeds to ¼ of the digits at the time point when the input voice comes to end, and the calculation of the remaining ¾ of the digits will be left for processing after the voice is uttered. The processing time for ¾ of the digits is the recognition response time with a large time lag, which is problematical is real time. To settle the problem, a complicated and expensive high-speed processor capable of parallel processing and pipeline processing will be required.

SUMMARY OF THE INVENTION

It is, therefore, an object of this invention to provide a continuous speech recognition system which is simple in construction and capable of shortening recognition response time.

Another object of this invention is to provide a continuous speech recognition system capable of reducing the number of calculations and amount of memory capacity required in achieving the above features.

A further object of this invention is to provide a continuous speech recognition system capable of removing the limitation on number of words (digits) that an input voice comprises in achieving the above features.

According to the present invention, there is provided a continuous speech recognition system for recognizing input speech composed of a plurality of continuously spoken words comprising: a speech analyzing means for analyzing an input signal at every given frame time point m and outputting an input pattern expressed as a time series of a feature vector consisting of a predetermined number of feature parameters, an input pattern memory to store the input pattern, a reference pattern memory to store a reference pattern consisting of a feature vector with the same format as the input pattern for each of a plurality (V) of predetermined words to be recognized, a distance calculating means to calculate the distance between the feature vector at a time point m (varied from start point to end point M) of said input pattern and the feature vector at a time point n of the reference pattern of the v-th word at every time point m under a predetermined distance formula by changing the time point n of the reference pattern of the v-th word in an arbitrary order from the start point to end point $N^v$, an asymptotic calculating means to calculate a similarity measure D(v, n) given by the cumulative sum of the distance at the time points n and path information F(v, n) indicating a time point of the input pattern at the start point of the v-th reference pattern on a path through which the similarity measure D(v, n) has been obtained by a predetermined asymptotic expression according to a dynamic programming process at every time point m based on the similarity measure and path information obtained at a time point (m−1), a digit similarity measure and digit path information calculating means to select a minimum similarity measure from among the similarity measures at the end time points of reference patterns of all the words obtained through the asymptotic calculating means, and to provide said minimum similarity measure as a digit similarity measure DB(m), a category to which the word corresponding to the minimum similarity measure belongs as a digit recognition category W(m)=v, and path information corresponding to the minimum similarity measure as digit path information FB(m) at the time point m, an initializing means to give the digit similarity measure DB(m−1) at a time point (m−1) as the initial value of the similarity measure and to give a time point as an initial value of the path information in the asymptotic calculating means, a decision making means to obtain a recognized result at a final digit from said digit recognition category W(M) at the end point M of said input pattern, to obtain an end point of said input pattern on the digit previous to the final digit by one from the digit path information at the end point M, obtain a recognized result on the digit previous to the final digit by one from the digit recognition category at the end point, and to obtain a recognized result on each digit sequentially toward the start point of the input pattern.

According to another aspect of this invention, the probability of erroneous recognition can be decreased by making one word correspond to one digit and thus limiting the number of input digits. In this case, a value on each digit will be obtained for similarity measure, path information, digit similarity measure, digit path information, digit recognition category, etc.

According to a further aspect of this invention, moreover, memory capacity can be curtailed by performing the asymptotic calculation in the direction to decrease time points of the reference pattern.

According to further aspect of this invention, the probability of erroneous recognition can further be decreased by selecting a suitable asymptotic calculation.

Other objects and features of the invention will be clarified from the following description with reference to the accompanying drawings.

BRIEF DESCRIPTION OF THE DRAWINGS

FIGS. 11A and 11B are flowcharts showing processing procedures of the above one embodiment of the invention;

FIG. 15 is a drawing representing how to store a similarity measure D(v, n) and path information F(v, n) in FIG. 13 in a memory;

FIG. 16 is a drawing representing how to store a digit similarity measure DB(m), digit path information FB(m) and a digit recognition category W(m) in FIG. 13 in a memory;

DESCRIPTION OF THE INVENTION

Figure 1:
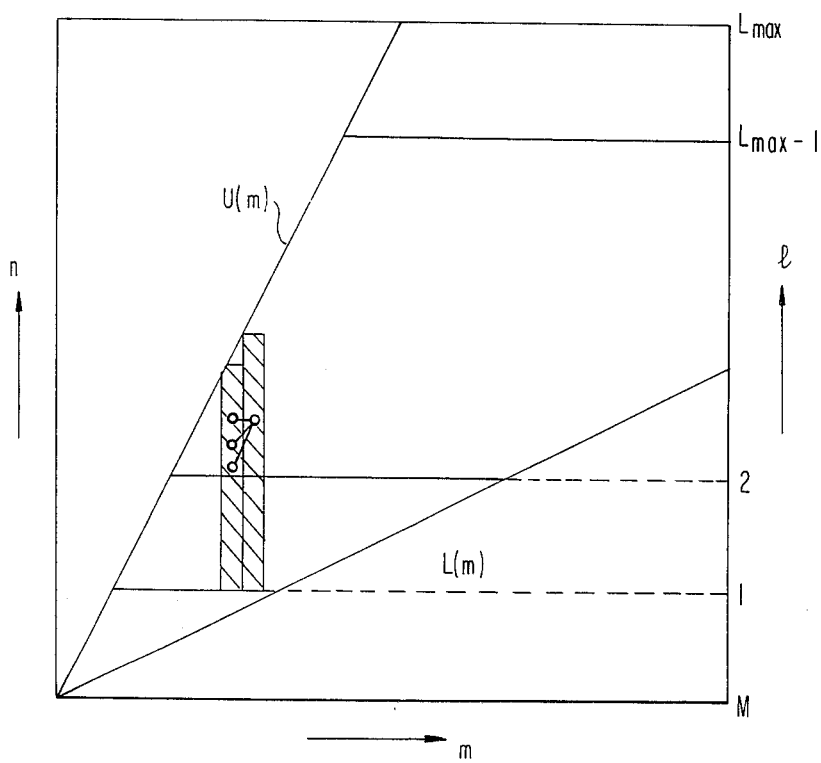
FIG. 1 is a drawing for explaining the fundamental principle of this invention.

A drawing illustrative of processing procedures according to the present invention is given in FIG. 1. As in the case of the paper by Myers et al., U(m) and L(m) denote an upper bound and a lower bound of a matching window domain for DP matching. The axis of the abscissa indicates a time point m of an input pattern A, and a feature vector (consisting of feature parameters of R) am at the time point m from a start 1 of speech to an end M is expressed by $$am = am1, am2, \ldots amr, \ldots, amR \tag{1}$$

where amr denotes the r-th feature parameter constituting am. Then, the axis of ordinate on the left side indicates a time point n of a reference continuous voice pattern B, and that on the right side indicates a digit number. Each digit corresponds to each reference word of the words to be recognized, and a time length of each digit varies according to the length of the reference word. Assuming the number of reference words is V and the v-th reference word is denoted as $B^v$, the time points of the reference word $B^v$ include time points from a start point $n=1$ of the digit to an end point determined on the length of the reference word $B^v$. Therefore, the feature vector (consisting of feature parameters of R) at the time point n of the reference word $B^v$ of a digit is expressed, as in the case of an, by the following:

$$b_n{}^v = b_{n1}{}^v, b_{n2}{}^v, \ldots, b_{nr}{}^v, \ldots, b_{nR}{}^v \tag{2}$$

Then, a distance d(m, n) between a feature vector am at the time point m of an input pattern and a feature vector $b_n{}^v$ at the time point n of the reference pattern of the v-th word on a digit is defined by $$d(m, n) = D(a_m, b_n{}^v) = \sum_{r=1}^{R} |amr - b_{nr}^v| \tag{3}$$

Figure 2:
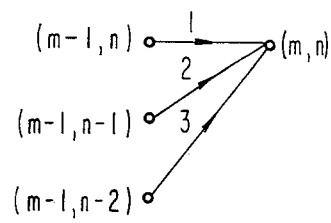
FIG. 2 is a drawing for explaining an allowable matching path for the similarity measure calculation.

The time points m and n are further made to correspond to each other by a time normalized function, and the cumulative sum of the distance d(m, n) between feature vectors at the time points is thus made corresponding along the time normalized function as defined by the similarity measure D(m, n). The similarity measure is calculated asymptotically as $$D(m, n) = d(m, n) + D(m-1, n) \tag{4}$$

$$\text{where } n = \text{argmin } D(m-1, n') \tag{5}$$

$$n - 2 \leq n' \leq n$$

where argmin Y means x with y minimized under the condition x∈X, and n refers to n' with D(m−1, n') minimized under $n-2 \leq n' \leq n$. In other words, the expression (4) indicates that a path in which the similarity measure will be minimized is selected from among the three paths from each point of (m−1, n), (m−1, n−1) and (m−1, n−2) to point (m, n) as shown in FIG. 2. The path in which the minimum value D(m−1, ñ) used for obtaining the similarity measure D(m, n) is selected is called a matching path, and the path information F(m, n) indicating this path is defined by $$F(m, n) = F(m-1, \tilde{n}) \tag{6}$$

According to the technique by Myers et al., the similarity measure is first calculated between each reference word pattern and an input pattern, and then the similar calculation is made for the next digit. Namely, the loop calculation order for DP matching is time point m, time point n, V indicating a number of the reference word pattern and digit number l. In consideration of the foregoing and FIG. 1, it is apparent that there may arise a time lag for recognition response as mentioned hereinbefore.

In noticing that the similarity measure at the time point m of the input pattern is ready for calculation if a similarity measure at the time point m−1 has been calculated, since a path for DP matching is incremental monotonously the present invention proposes a continuous speech recognition system capable of reducing the recognition response time lag and processing synchronously with a voice input by carrying out the calculation of the similarity measure in a string vertically along the time axis of the reference pattern at each time point of the input pattern instead of carrying out in the input pattern direction like the technique proposed by Myers et al.

In this invention, the similarity measure is calculated in a vertical string including each digit and parallel with an axis as shown in the oblique-lined portion of FIG. 1, however, the following parameters will be defined prior to giving a description thereof.

D(l, v, n) is an accumulated distance as of the time point n of a reference pattern of the v-th word on the l-th digit, which is called the similarity measure; F(l, v, n) is the start point of the path that gives the similarity measure D(l, v, n) at the time point n of the reference pattern on the v-th word on the l-th digit is obtained, indicating a time point of the input pattern at time point 1 of the reference pattern on the l-th digit, it is called path information; DB(l, m) is a minimum value of similarity measures D(l, v, $N^v$) obtained through calculations as far as an end point $N^v$ for each of the reference patterns of all the words at the time point m of the input pattern and is called a digit similarity measure; FB(l, m) indicates path information corresponding to the similarity measure D(l, v, $N^v$) of the digit similarity measure DB(l, m) and is called digit path information; W(l, m) indicates a category to which a word of the reference pattern used when the digit similarity measure DB(l, m) is obtained belongs and is called a digit recognition category; R(l) is a recognized result of the l-th digit.

Figure 3:
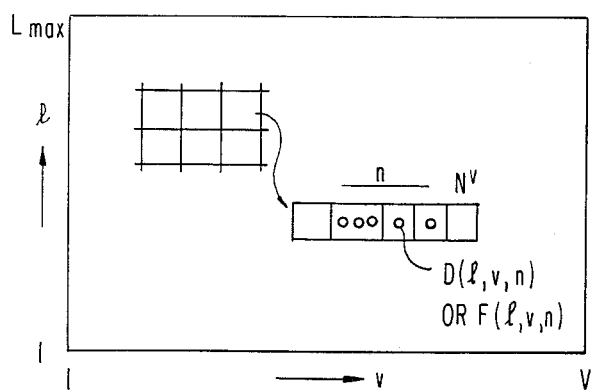
FIG. 3 is a drawing representing how to store a similarity measure D(l, v, n) and path information F(l, v, n) in a memory in an embodiment of this invention.
Figure 4:
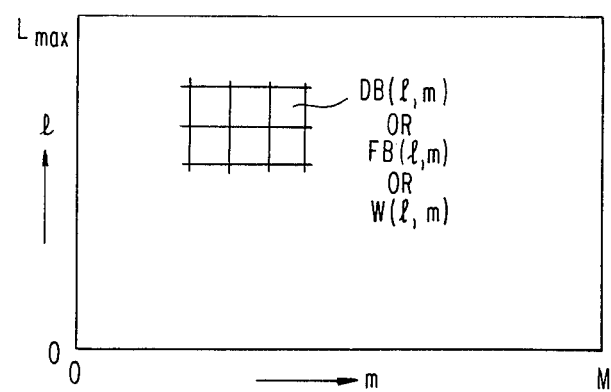
FIG. 4 is a drawing representing how to store a digit similarity measure DB(l, m), digit path information FB(l, m) and a digit recognition category W(l, m) in a memory in an embodiment of this invention.

As initial values, a digit similarity measure DB(l−1, m−1) and a similarity measure D(m−1, n) at a point m−1 on each digit being necessary for calculation of the similarity measure in a vertical string including all digits are obtained through calculation at the point m−1. It is noted here that the similarity measure D(m−1, n) and the path information F(m−1, n) at the point m−1 for each digit l and each word v should be stored. The similarity measure D(m−1, n) and the path information F(m−1, n) of the word v on the digit l are given by D(l, v, n) and F(l, v, n) respectively. FIG. 3 shows how D(l, v, n) and F(l, v, n) are stored in a memory and FIG. 4 shows how DB(l, m), FB(l, m) and W(l, m) are stored.

Next, the fundamental principle of the continuous speech recognition system according to the present invention will be described. For similarity measure calculations, an asymptotic calculation for dynamic programming will be performed in order at each time point m along the time axis of an input pattern in the matching window domain between the upper bound U(m) and the lower bound L(m) as shown in FIG. 1. Initial conditions for the similarity measure calculation will be given by $$D(l, v, n) = \infty \tag{7}$$

$$l = 1 \sim L\text{max}, v = 1 \sim V, n = 1 \sim N^v$$

$$DB(l, m) = \infty \quad (8)$$

$$l = 0 \sim Lmax, \; m = 0 \sim M$$

$$DB(0, 0) = 0 \quad (9)$$

The similarity measure calculation in a string vertically and parallel with the n axis at the time point m of the input pattern will be performed as follows. First, a vector distance between the feature vector am at the time point m of the input pattern and a reference word pattern $b_n^v$ on the v-th digit is calculated according to the expression (1). Then follows a calculation of the similarity measure in a vertical string on each digit. With the values initialized at $$D(l, v, 0) = DB(l-1, m-1) \quad (10)$$

$$F(l, v, 0) = m - 1 \quad (11)$$

the similarity measure calculation is carried out through calculating expressions (12) and (13) so as to decrease the n between U(m) and L(m).

$$D(l, v, n) = d(n) + D(l, v, \hat{n}) \quad (12)$$

$$F(l, v, n) = F(l, v, \hat{n}) \quad (13)$$

where $$\hat{n} = \text{argmin} \; D(l, v, n') \quad (14)$$

$$n - 2 \leq n' \leq n$$

As shown in FIG. 2 and expressions (12) and (14), the calculation at the point (m, n) is obtainable from the similarity measure of the three points (m−1, n), (m−1, n−1), (m−1, n−2). Then, the calculation at the point (m, n−1) can be obtained from the similarity measure of the three points (m−1, n−1), (m−1, n−2), (m-1, n-3) and, the similarity at the point (m−1, n) not being used therefor, no influence will be exerted on a calculation at the point (m, n−1) by storing a result calculated at the point (m, n) in the point (m−1, n). Therefore the calculation of the similarity measure in the direction of decreasing n, makes possible the use of a storage area in common for the similarity measure at point m−1 and the similarity measure at point m, thus saving memory. After carrying out the above calculations in a string vertically, the similarity measure $D(l, v, N^v)$ at an end $N^v$ of the reference word pattern of each word v on each digit is compared with the digit similarity measure DB(l, m) which is a minimum word similarity measure on the digit calculated so far, and when $D(l, v, N^v)$ is less than DB(l, m): the similarity measure $D(l, v, N^v)$ is made to be the digit similarity measure DB(l, m), a category v to which the reference word pattern belongs; a digit recognition category W(l, m), and matching path information $F(l, v, N^v)$ through which the similarity measure $D(l, v, N^v)$ is obtained; and digit path information FB(l, m) is determined.

Namely, where $$DB(l, m) \; D(l, v, N^v),$$

then $$DB(l, m) = D(l, v, N^v) \quad (15)$$

$$W(l, m) = V \quad (16)$$

$$FB(l, m) = F(l, v, N^v) \quad (17)$$

The similarity measure thus obtained in a vertical string is calculated for V reference word patterns.

The calculation of the similarity measure in a vertical string is carried out similarly for each of the reference word patterns of V with the time point m of the input pattern increased by one, which proceeds as far as the end point M of the input pattern.

Finally, a decision on the input pattern is made according to the digit path information FB(l, m) and the digit recognition category W(l, m). The method of this decision comprises, as described in the paper by Myers et al., obtaining a minimum value of the digit similarity measure DB(l, M) on each digit at the end point M of the input pattern in the digits permitted, i.e., from Lmin-th digit to the Lmax-th digit, and a digit L whereat the minimum value obtained is a digit number of the input pattern. Further, a recognized result R(L) on the L-th digit is obtained from W(L, M), and an end point of the (L−1)th digit is obtained from digit path information FB(L, M). A recognized result R(l) is then obtainable at each digit through repeating the above operation by turns.

Namely, the digit L of the input pattern is obtained from the following:

$$L = \text{argmin} \; (DB(l, M)) \quad (18)$$

$$Lmin \leq l \leq Lmax$$

Then, the recognized result R(L) on the L-th digit is obtained from $$R(L) = W(L, m) \quad (19)$$

and the end point m of the (L−1)th digit is obtained from $$m = FB(L, M) \quad (20)$$

Generally, the recognized result R(l) on the l-th digit and the end point m of the (l−1)-th digit are obtained from $$R(l) = W(l, m) \quad (21)$$

$$m = FB(l, M) \quad (22)$$

and words of all the digits are ultimately recognized.

According to the present invention, the calculation of the similarity measure can be carried out in the time axis direction of the input pattern, as described above. Upon detection of the input of speech, the calculation is commenced right away, and since the calculation is already underway synchronously with the speech input, processings for decision given in the expressions (18)∼(22) can be ready concurrently with the end of the speech. The recognition response time can therefore be remarkably shortened as compared with the above-mentioned technique by Myers et al.

Then, while the number of times for distance calculation is required at $N^v \cdot M \cdot V \cdot Lmax$ in the case of technique by Myers et al., the invention is effective to decrease the number to $N^v, V \cdot M$ times, which will be apparent from the description given hereinabove, and thus distance calculations can be saved considerably to 1/Lmax in quantity as compared with the former number.

Figure 5:
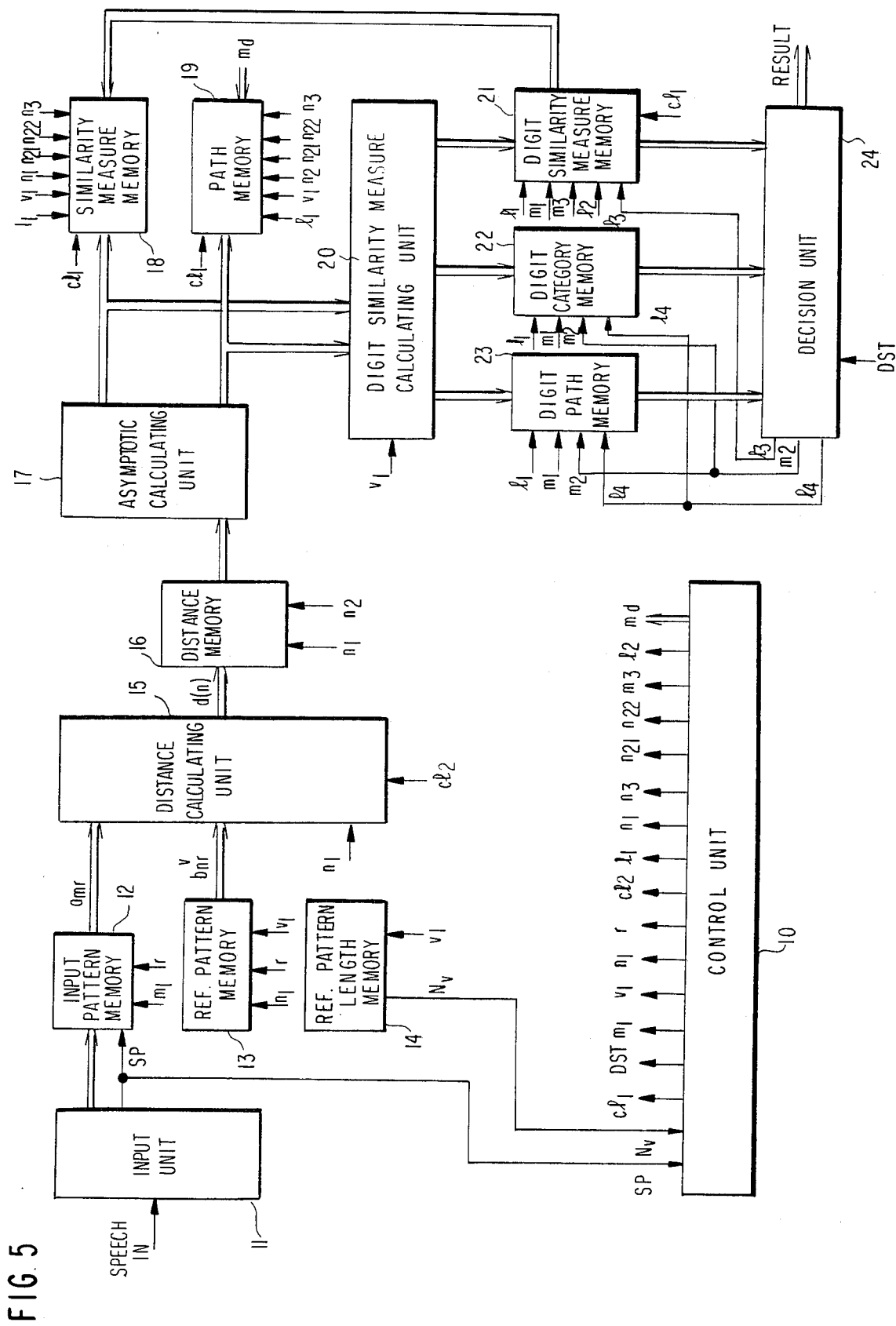
FIG. 5 is a block diagram of a continuous speech recognition system given in one preferred embodiment of this invention.
Figure 6:
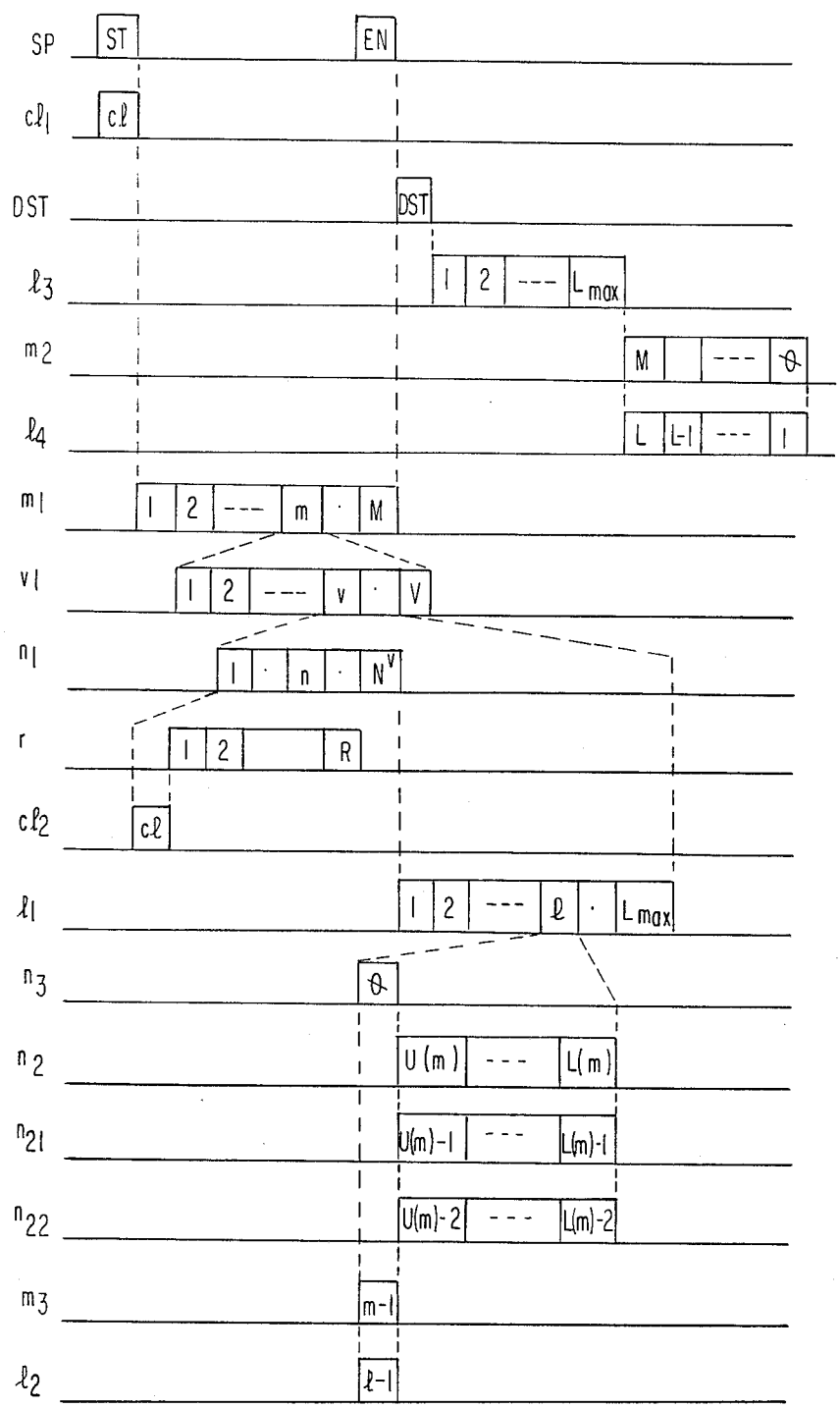
FIG. 6 is a time chart of a signal at each part in FIG. 5.

Now, an embodiment of the system according to the present invention will be described with reference to the accompanying drawings. FIG. 5 is a block diagram representing the composition of one embodiment of this invention; FIG. 6 is a time chart of control command signals for each part given in FIG. 5. A control unit 10 functions to control other units by control command signals $Cl_1$, DST, $m_1$, $v_1$, $n_1$, r, $Cl_2$, $l_1$, $n_3$, $n_2$, $n_{21}$, $n_{22}$, $m_3$, $l_2$, etc. as shown in FIG. 6, and a detailed description thereof will be given correlatively with the operation of other units in each occasion.

An input unit 11 analyzes an input speech given by a signal SPEECH IN and outputs a feature vector $a_m$ consisting of a time series of R feature parameters shown in the expression (1) at a constant interval (frame). Speech analysis occurs by, for example, frequency analysis by a filter back constituted of a multichannel (R-channel) filter. Then, the input unit 11 monitors the level of the input speech, detects the start and the end of the speech, and sends a signal ST indicating the start and a signal EN indicating the end as a signal SP to the control unit 10 and an input pattern memory 12.

After receipt of the SP signal in the input pattern memory 12, the feature vector $a_m$ given by the input unit 11 in accordance with the signal $m_1$ (ranging from 1 to the end time point M) which indicates a time point of the input pattern supplied from the control unit 10 is stored.

Reference words of V predetermined as words to be recognized, are analyzed to obtain a feature vector consisting of feature parameters of R shown in the expression (2) at each time point (frame). Thus obtained 1st to V-th reference word patterns $B^1$, $B^2$, ... $B^v$ (each pattern being given in a time series of feature vectors) are stored in a reference pattern memory 13. A length $N^v$ of the reference patterns $B^v$ of the v-th word is stored in a reference pattern length memory 14.

A signal $v_1$ from the control unit 10 specifies the v-th reference word and indicates a category to which the reference word belongs. The length $N^v$ of the reference word pattern $B^v$ of the specified reference word is read out of the reference pattern length memory 14 in response to the signal $v_1$. After reception of $N^v$ signal, the control unit 10 generates a signal (1~Nv) corresponding to the time point n of the reference word pattern.

From the input pattern memory 12 the r-th feature parameter amr of the feature vector am1 corresponding to the time point of the signal $m_1$ is supplied to a distance calculating unit 15 in response to signals $m_1$ and r from the control unit 10. On the other hand, the r-th feature parameter $b_{nr}^v$ of the feature vector $b_n^v$ (n=1~$N^v$) at a time point $n_1$ of the v-th reference word pattern is read out of the reference pattern memory 13 having received signals $v_1$, $n_1$ and r and is thereafter sent to the distance calculating unit 15.

Figure 7:
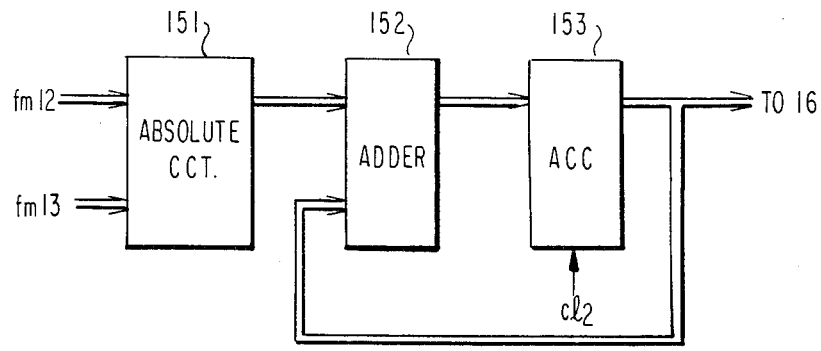
FIG. 7 is a block diagram representing the composition of a distance calculating unit 15 in FIG. 5.

Upon receipt of $a_{mr}$ and $b_{nr}^v$, the distance calculating unit 15 calculates the distance d(m, n) defined by the expression (3). Since the calculation according to the present invention is carried out in a vertical string as illustrated in FIG. 1, m is handled as fixed, d(m, n) can be expressed as d(n), and thus d(n) is obtained at the time points n=1, 2, ..., $N^v$ on each digit and stored in a distance memory 16. An example of the composition of a distance calculating unit 15 is shown in FIG. 7. After reception of the signal SP indicating the start time point of the input speech the contents stored in an accumulator 153 are cleared according to a clear signal $Cl_2$ generated from the control unit 10 for each n at m. An absolute value circuit 151 provides an absolute value $|a_{mr}-b_{nr}^v|$ of the difference between feature parameters $a_{mr}$ and $b_{nr}^v$ sent from the input pattern memory 12 and the reference pattern memory 13, and the result is supplied to one input terminal of an adder 152. An adder output is stored in the accumulator 153. An output terminal of the accumulator 153 is connected to other input terminal of the adder 152, and d(n) of the expression (3) is obtained finally as an output of the accumulator 153 by changing the signal r from 1 to R. The distance d(n) thus obtained is stored in the distance memory 16 with its address specified at $n_1$.

Initialization of the similarity measure and the digit similarity measure which is necessary for the asymptotic calculation of similarity measures is carried out by the signal $Cl_1$ from the control unit 10 before the speech is inputted, and the values given by the expressions (7), (8) and (9) are set in a similarity measure memory 18 and a digit similarity measure memory 21.

Figure 8:
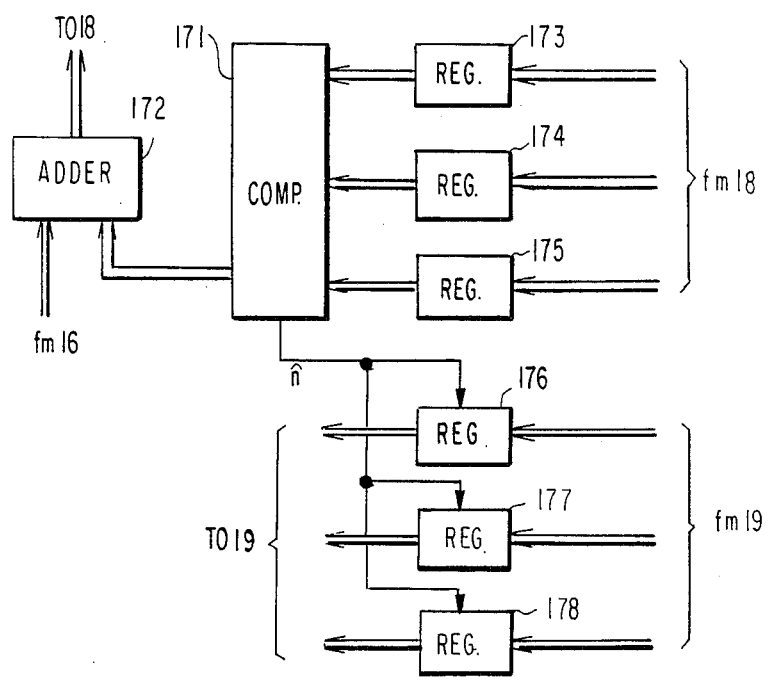
FIG. 8 is a block diagram representing the composition of an asymptotic calculating unit 17 in FIG. 5.

An asymptotic calculating unit 17 computes the similarity measure D(l, v, n) and the path information F(l, v, n) through the computation of the expressions (12), (13) and (14). To save memory capacity for the similarity measure and the path information, as described hereinbefore, the time point of a reference pattern is decreased by one from the upper bound U(m) of the matching window to the lower bound L(m). A signal $n_2$ is used for this control of the time point. The distance stored at an address $n_2$ is read out of the distance memory 16 in response to a signal $n_2$ from the control unit 10. The asymptotic calculating unit 17 is comprised of three similarity measure registers 173, 174, 175, a comparator 171, an adder 172, and three path registers 176, 177, 178, as shown in FIG. 8. Similarity measures D(l, v, n), D(l, v, n−1), D(l, v, n−2) and path information F(l, v, n), F(l, v, n−1), and F(l, v, n−2), specified by the signals $n_2$, $n_{21}$ and $n_{22}$ indicating the time point of a reference pattern, and the two time points previous to the time point of the signal $n_2$, are stored in the similarity measure registers 173~175 and the path registers 176~178, respectively. The comparator 171 detects a minimum value from the three similarity measure registers 173, 174, 175 and issues a gate signal n̂ for selecting a path register corresponding to a similarity measure register from which the minimum value has been obtained. A content of the path register selected by the gate signal n̂ is stored in F(l, v, m) of a path memory 19. Then, the minimum value D(l, v, n) of the similarity measure outputted from the comparator 171 is added to the distance d(n) read out of the distance memory 16 through the adder 172 and stored in the similarity measure memory 18 as D(l, v, n).

The asymptotic calculation is performed with the time point from U(m) to L(m) in response to the signal $n_2$, and the word similarity measure D(l, v, $N^v$) is computed for each v on each l.

Figure 9:
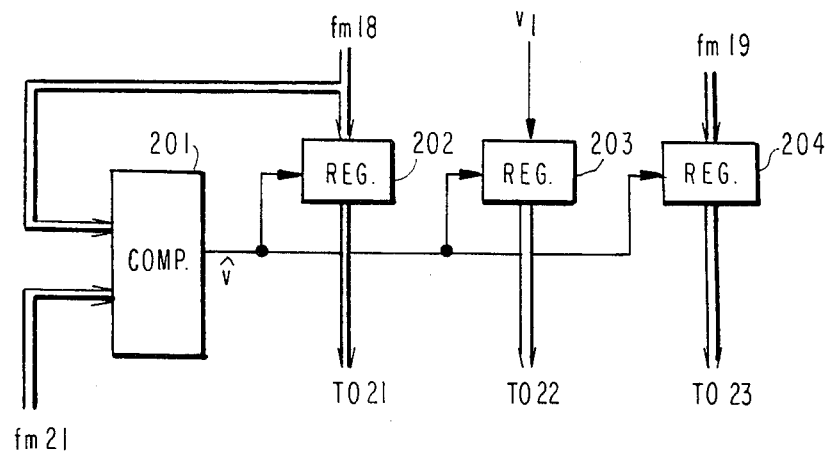
FIG. 9 is a drawing representing the composition of a digit similarity measure calculating unit 20 in FIG. 5.

A digit similarity measure calculating unit 20 performs the processes of the expressions (15), (16), (17) and obtains, one after another, minimum values of word similarity measures D(l, v, $N^v$) of V which are obtained for each of words of V on each digit. As shown in FIG. 9, the digit similarity calculating unit 20 is comprised of a comparator 201, a register 202 to hold the word similarity measure D(l, v, $N^v$), a register 203 to hold the signal $v_1$ indicating the category v to which a reference word pattern belongs, and a register 204 to hold the path information F(l, v, $N^v$). The signal $l_1$ specifies the digit of a reference continuous speech pattern, ranging to Lmax for each of the signals $v_1$. The word similarity measure $D(l, v, N^v)$ and the word path information $F(l, v, N^v)$ are read out of the similarity measure memory 18 and the path memory 19 according to the signal $l_1$ generated from the control unit 10, stored in the registers 202 and 204 respectively, and the category v to which the reference word pattern belongs is stored in the register 203. The comparator 201 compares the above word similarity measure $D(l, v, N^v)$ with the digit similarity measure $DB(l, m)$ read out of the digit similarity measure memory 21, and when $D(l, v, N^v)$ is less than $DB(l, m)$, generates, a gate signal $\hat{v}$. The word similarity measure $D(l, v, N^v)$, the category v and the word path information $F(l, v, N^v)$ held in the registers 202, 203, 204, respectively, are stored in the digit similarity measure memory 21 as $DB(l, m)$, in the digit recognition category memory 22 as $W(l, m)$ and in the digit path memory 23 as $FB(l, m)$ respectively in response to the gate signal v.

Further, signals $n_3$, $m_3$ and $l_2$ indicating the time point 1 of a reference pattern, the time point $m-1$ one previous to the time point m of the input pattern specified by a signal $m_1$, and the digit one previous to that specified by the signal $l_1$ respectively, are generated from the control unit 10. The initialization for the similarity measure calculation in a vertical string as shown in expressions (10) and (11) is carried out according to those signals. Namely, a digit similarity measure $DB(l-1, m-1)$ specified by the signals $l_2$ and $m_3$ is read out of the digit similarity measure memory 21 and stored in the similarity measure memory 18 at the address specified by signals l, $v_1$, $n_3$ as $D(l, v, o)$. Then, a signal $m_d$ indicating an address specified by the signal $m_3$ is supplied to the path information memory 19 from the control unit 10. And a value $(m-1)$ specified by the signal $m_d$ is stored in the path memory 19 as $F(l, v, o)$ at the address specified by the signals $l_1$, $v_1$, $n_3$.

Figure 10:
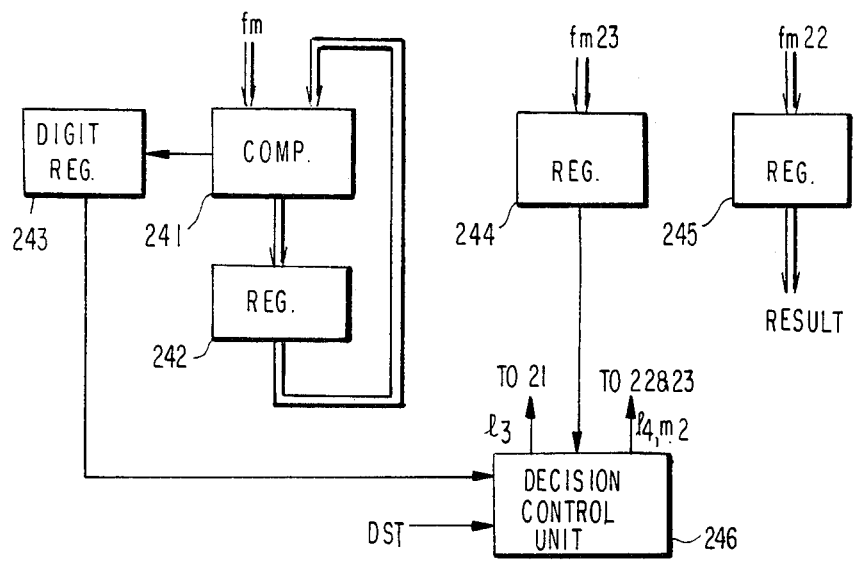
FIG. 10 is a drawing representing the composition of a decision unit 24 in FIG. 5.

A decision unit 24 carries out the decision processing shown in the expressions (18)~(22) and outputs a recognized result R(l) on each digit of the input pattern based on the digit path information $FB(l, m)$ and the digital recognition category $W(l, m)$. In detail, as shown in FIG. 10, the decision unit 24 is comprised of a comparator 241, a register 242 to hold a minimum digit similarity measure, a register 243 to hold a digit number, a register 244 to hold the digit path information $F(l, m)$, a register 245 to hold a recognized result, and a decision control unit 246. When the end of the speech is detected by the input unit 11, in response to the signal SP, the control unit 10 supplies a signal DST for starting the above decision processing to the decision unit 24. After receipt of the signal DST, the decision control unit 246 issues a signal $l_3$ indicating the digit to the digit similarity measure memory 21. The digit similarity measure $DB(l, M)$ on each digit of the first to the Lmax-th digit at the end point M of the input pattern is read out sequentially of the digit similarity measure memory 21 according to the signal $l_3$ and compared with a value stored in the register 242 by the comparator 241. The least value from the comparator 241 is stored in the register 242, and a digit number l then obtained is stored in the register 243. After the digit similarity measures of Lmax are read according to the signal $l_3$, the content of the register 243 represents a digit number of the input pattern. From the digit path memory 23 and the digit recognition category memory 22, $FB(L, M)$ and $W(L, M)$ are read and stored in the register 244 and the register 245 in response to address signals $l_4$ and $m_2$ corresponding to $l=L$, $m=M$ from the decision control unit 246. The content of the register 245 is generated as a recognized result. Further, the decision control unit 246 issues $l=l-1$, m=(value stored in the register 244) to the digit path memory 23 and the digit recognition category memory 22 as address signals $l_4$ and $m_2$, and $FB(l, m)$ and $W(l, m)$ of the $(L-1)$-th digit are read and stored in the register 244 and the register 245. Recognized results on the L digits are outputted from a register 245 by repeating the above processing from L to 1 sequentially.

Figure 11B:
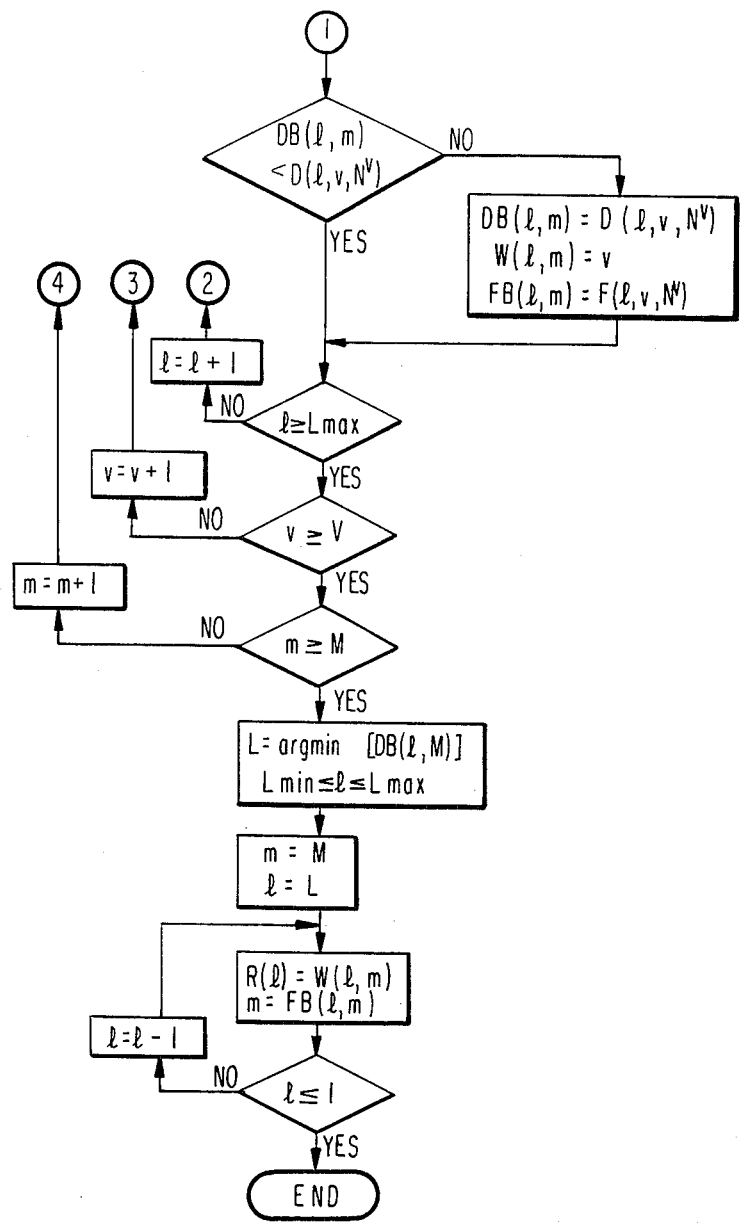

A flowchart for procedures in the processing of the continuous speech recognition system according to the present invention is as shown in FIG. 11A and FIG. 11B.

Next, a continuous speech recognition system given in another embodiment of the present invention capable of reducing the memory capacity requirement and quantity or calculations will be described.

In the embodiment described above, since addresses, l, v, and n are necessary for the similarity measure and the path information, the required memory capacity becomes large in proportion to the digit number l. Further, the number of asymptotic calculations given in the expressions (12), (13), (14) increase in proportion to the digit number l. However, the digit number is not necessarily limited for recognition of a continuously spoken, numeric string in most cases.

This embodiment proposes a continuous speech recognition system for which a limitation on the digit number included in an input speech can be removed and further both memory capacity required and the number of calculations can be decreased to 1/Lmax as compared with the above-mentioned embodiment.

Described first is the feasibility of the digit limitation being removed, according to this invention. Now, in a point $(m_1, n_1)$ on a matching path $(m, n(m))$ where a whole minimum similarity measure is obtained, a partial similarity measure obtained from the start to the point $(m_1, n_1)$ along the matching path represents a minimum value of the partial similarity measure obtained along all the matching paths passing the point $(m_1, n_1)$. Namely, the minimum value of a whole similarity measure obtained along all the matching paths passing point $(m_1, n_1)$ is given as the sum of each minimum value of the partial similarity measure from the start to the point $(m_1, n_1)$ and the partial similarity measure from the point $(m_1, n_1)$ to the end. This is given by the following expression:

$$S(A, C) = \min_{n(m)} \sum_{m=1}^{M} d(m, n) \qquad (23)$$

$$= \min_{n(m)} \sum_{m=1}^{m_1} d(m, n) + \min_{n(m)} \sum_{m=m_1+1}^{M} d(m, n)$$

where $(m_1, n_1)$ is point on $n(m)$.

Thus a minimization from point $(m_1, n_1)$ to the end can be performed independently from the minimization from the start to the point $(m_1, n_1)$.

Figure 12:
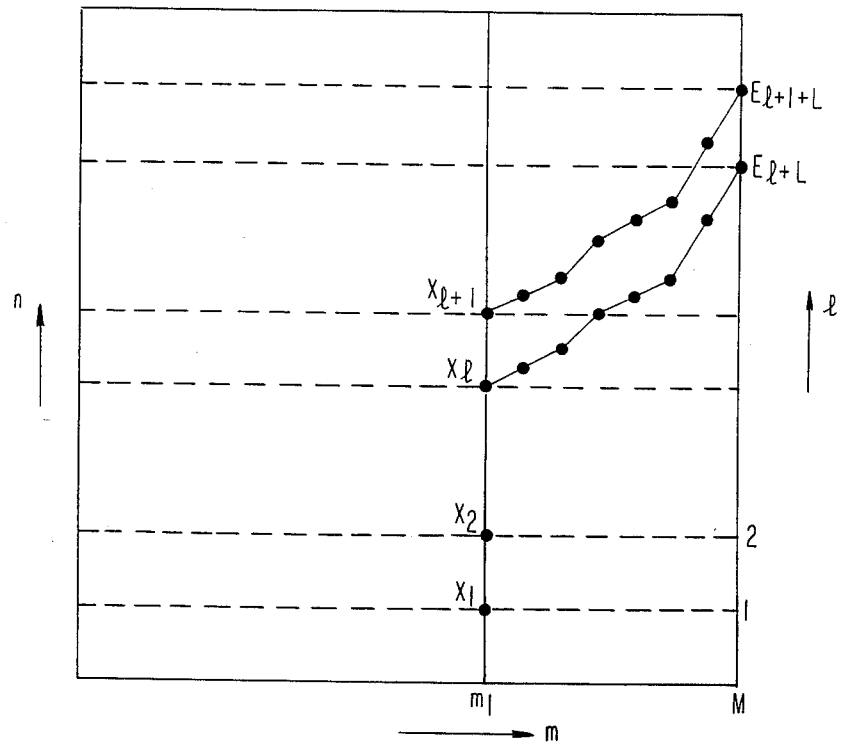
FIG. 12 is a drawing for explaining the principle of another embodiment of this invention.

Taken up here is the minimization from a point $X_l$ corresponding to a time point $n(=N^v)$ of the v-th reference pattern on the l-th digit at a time point $m_1$ of the input pattern to a point $E_{l+L}$ corresponding to a time point $n(=N^v)$ of the reference pattern on the $(l+L)$-th digit at an end time point M of the input pattern as shown in FIG. 12. The partial similarity measure $S_L{}^l(A', C_L{}^l)$ is obtainable from a partial input pattern $A'=(a_{m_1+1}, a_{m_1+2}, \ldots a_M)$ and a partial pattern of the reference continuous speech pattern $C_L{}^l=B^{vl}$, $B^{vl+1}, \ldots, B^{vl+L}$, as indicated by the following:

$$S_L{}^l(A', C_L{}^l) = \min_{n(m)} \sum_{m=m_1+1}^{M} d(m, n) \tag{24}$$

Now, if the digit number is free from limitation, a digit number $L$ which at a minimum partial similarity measure is acquired through changing $L$ is obtained as the digit number of the partial input pattern $A'$. It is therefore given by $$S_{\hat{L}}{}^l(A', C_{\hat{L}}{}^l) = \min_L S_L{}^l(A', C_L{}^l) \tag{25}$$

$$\hat{L} = \text{argmin}\, S_L{}^l(A', C_L{}^l) \tag{26}$$

$$C_L{}^l = B^{\hat{v}l}, B^{\hat{v}l+1}, \ldots B^{\hat{v}l+L} \tag{27}$$

Then, the minimization from a point $X_{l+1}$ to an end $E_{l+1+L}$ will be taken up. The partial similarity measure $S_L{}^{l+1}(A1, C_L{}^{l+1})$ is obtained from a partial input pattern $(a_{m_1+1}, a_{m_1+2}, \ldots, a_M)$ and a reference continuous speech pattern $C_L{}^{l+1}=B^{vl+1}, B^{vl+2}, \ldots, B^{vl+1+L}$, where $C_L{}^{l+1}$ is that of being the same as the $C_L$ connecting reference word patterns of L in very order. Therefore, $$S_L{}^{l+1}(A', C_L{}^{l+1}) = S_L{}^{l+1}(A', C_L{}^l) = S_L{}^l(A', C_L{}^l) \tag{28}$$

and thus the minimization from the point $X_{l+1}$ to the end $E_{l+1+L}$ has the same result as the minimization from the point $X_l$ to the end $E_{l+L}$.

If there is no limitation effective on the digit number, as described, partial similarity measures from each point $X_1, X_2, \ldots, X, \ldots$ to an end are all the same and given by the expressions (24), (25), (26), a reference pattern series than may be obtained by $C_L{}^l$ of the expression (27). Meantime, the whole similarity measure is given, as shown in the expression (23), by the sum of the partial similarity measure from the start to the point $X_l$ and the partial similarity measure from the point $X_l$ to the end:

$$S(A, C) = \min \sum_{m=1}^{m_1} d(m, n) + \min \sum_{m=m_1+1}^{M} d(m, n) \tag{29}$$

$$= \min S(A'', C_l'') + S_{\hat{L}}{}^l(A', C_{\hat{L}}{}^l)$$

Namely, it is indicated that a minimum value of the similarity measure between a partial input pattern $A''$ $(a_1, a_2, \ldots, a_{m_1-1})$ from the start to a time point $m_1-1$ and a reference pattern on the first digit, the second digit or the l-th digit is obtained, and with the minimum value as an initial value, a similarity measure between the remaining partial input pattern $A'$ and a reference pattern $C_L{}^l$ can be obtained. In other words, the calculation of a similarity measure on the latter part is identified with that for which the ensuing digit is regarded as the first digit to be newly calculated with the minimum digit similarity measure of the former part as an initial value therefor. From applying the law that "since the similarity measure of the latter part takes the same path irrespective of starting from any point of $X_1, X_2 \ldots, X,$ $\ldots$, the calculation is ready with the minimum value of the former part as an initial value for the first digit to be newly calculated" to all the time points m, the calculation is given only on the first digit at $m=1$, then a digit similarity measure at the time point $m-1$ may be employed as an initial value for the first digit at a time point m, and thus the calculation will be carried out only on the first digit. As a result, the similarity measure is obtainable through a calculation for only one digit at each time point m.

Next, a process representing the fundamental principle of this embodiment will be described. The procedure is basically the same as that of the system given in FIG. 5, without digit parameter L.

The similarity measure calculation is obtained by using an asymptotic expression for dynamic programming in the order of the time axis m of an input pattern under initialization.

The initialization comes in $$D(v, n) = \infty \tag{30}$$

$$v = 1 \sim V, \; n = 1 \sim N^v$$

$$DB(o) = 0 \tag{31}$$

$$DB(m) = \infty \tag{32}$$

$$m = 1 \sim M$$

A similarity measure calculation in a string vertically and parallel to an axis n at the time point m of an input pattern is performed as follows. With initial values as $$D(v, o) = DB(m-1) \tag{33}$$

$$F(v, o) = m-1 \tag{34}$$

the following expressions (35), (36), (37) will be calculated in the direction to decrease n.

$$D(v, n) = d(am, bn^v) + D(v, n) \tag{35}$$

$$F(v, n) = F(v, n) \tag{36}$$

where, $$n = \text{argmin}\,[D(v, n')] \tag{37}$$

$$n-2 \leq n' \leq n$$

After execution of the above asymptotic calculation in a string vertically, a similarity measure $D(v, N^v)$ at the end $N^v$ of the reference word pattern is compared with a digit similarity measure $DB(m)$ which is the minimum word similarity measure calculated so far. When $D(v, N^v)$ is less than $DB(m)$, the similarity measure $D(v, N^v)$ is regarded as a new digit similarity measure $DB(m)$, the category v to which the reference word pattern belongs is regarded as a digit recognition category $W(m)$, and the matching path information $F(v, N^v)$ whereby the similarity measure $D(v, N^v)$ is obtained is regarded as a digit path information $FB(m)$. Namely, when $DB(m) > D(v, N^v)$, the following processing will be carried out.

$$DB(m) = D(v, n^v) \tag{38}$$

$$W(m) = v \tag{39}$$

$$PB(m) = F(v, N^v) \tag{40}$$

The similarity measure calculations in a vertical string which are carried out as above will be executed for reference word patterns of V.

Next, a similar calculation in a vertical string is executed for each of reference word patterns of V at the time point m of the input pattern increased by one, thus obtaining the similarity measure as far as the end point M of the input pattern.

Finally, a decision on the input pattern will be made according to the digit path information FB(m) and the digit recognition category W(m). The method of decision comprises obtaining first a recognized result R(L) from W(M) at the end M of the input pattern and then obtaining an end point of the (L−1)-th digit from a digit path information FB(M). A recognized result $W(m_{L-1})$ at the point FB(M) which is an end $m_{L-1}$ of the (L−1)-th digit represents R(L−1) on the (L−1)-th digit. In brief, the decision will be obtained by the following processes.

$$R(l) = W(m) \qquad (41)$$

$$m = FB(m) \qquad (42)$$

The recognized result R(l) on each digit l is obtained by repeating the above processing.

As described, according to the present invention, the similarity measure can be calculated collectively on one digit instead of being carried out on each digit by removing the limitation of the digit number of an input pattern, thus decreasing both required memory capacity and calculation quantity to 1/Lmax (Lmax being a maximum digit number of input speech) of the first embodiment.

Figure 14:
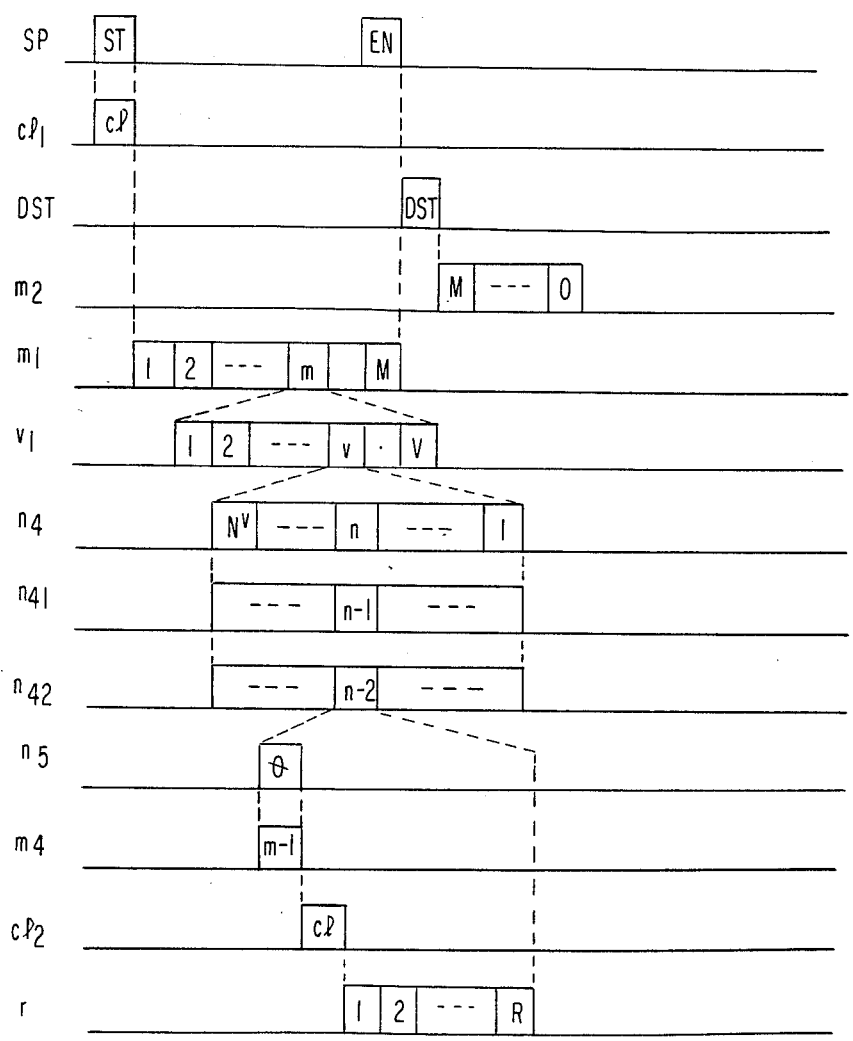
FIG. 14 is a time chart of a signal at each part in FIG. 13.
Figure 13:
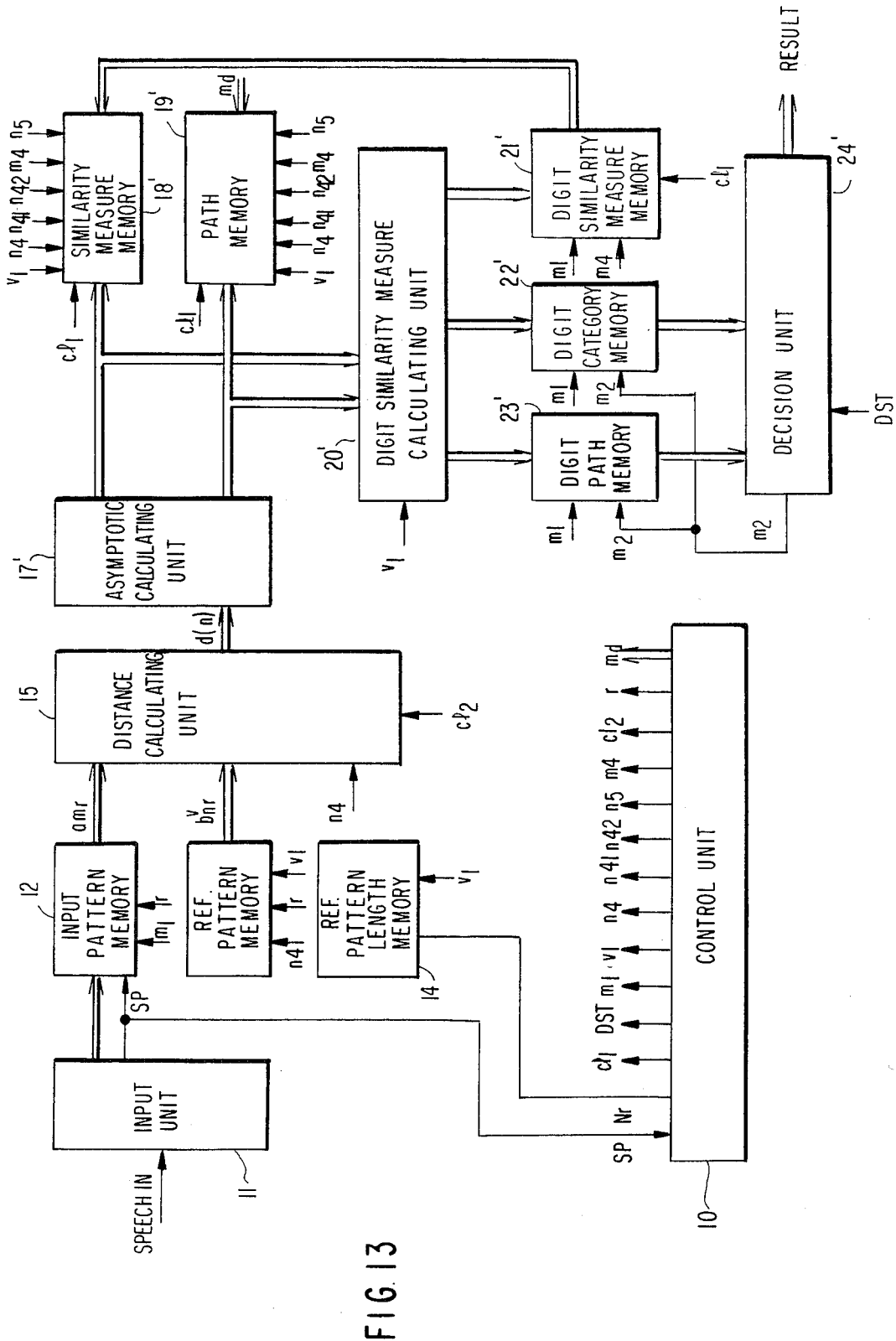
FIG. 13 is a block diagram of a continuous speech recognition system given in a further embodiment of this invention.

The composition of the continuous speech recognition system according to this embodiment is shown in FIG. 13. The embodiment is basically the same as that of FIG. 5, except that the system is free from control by a signal indicating the digit l and the distance memory 16 is not required. FIG. 14 shows a time chart of signals to control the embodiment of FIG. 13, and like signals are identified with the signals given in FIG. 6 by the same symbols. A signal $n_4$ to decrease by one sequentially from an end $N^v$ of the v-th reference word pattern is used instead of the signal $n_1$. Construction and operation of the input unit 11, the input pattern memory 12, the reference pattern memory 13, the reference pattern length memory 14 and the distance calculating unit 15 are the same as those of FIG. 5, and hence no further description will be given here.

A similarity measure D(v, n) and path information F(v, n) are stored in a similarity measure memory 18' and path information memory 19' respectively in a two-dimensional embodiment as shown in FIG. 15. The information DB(m), FB(m) and W(m) which are stored in a digit similarity measure memory 21', a digit recognition category memory 22' and a digit path information memory 23' are of the one-dimensional construction shown in FIG. 16.

An initialization for the asymptotic calculation is performed by a signal $Cl_1$ from the control unit 10 before speech is inputted, and values given in the expressions (30), (31), (32) are set in the similarity measure memory 18' and the digit similarity measure memory 21'.

Figure 17:
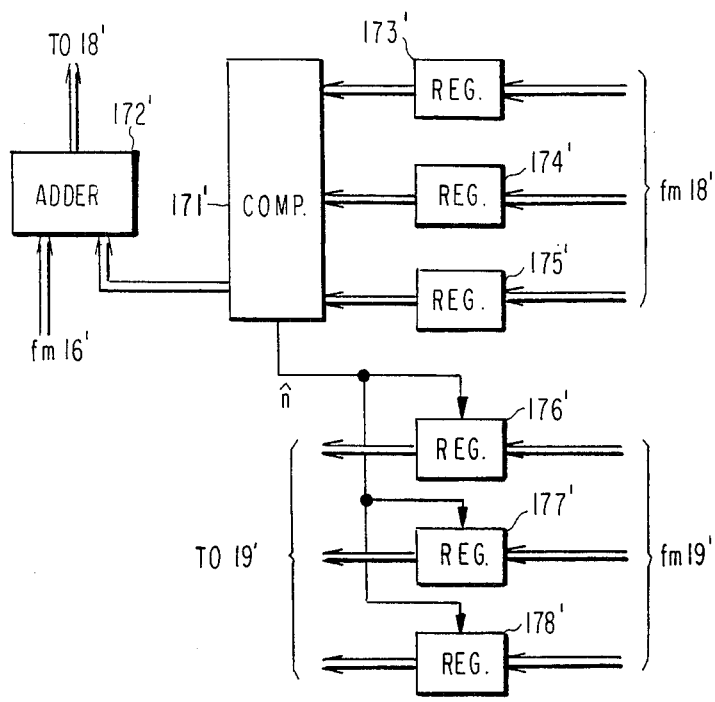
FIG. 17 is a block diagram representing the composition of an asymptotic calculating unit 17' in FIG. 13.

An asymptotic calculating unit 17' executes asymptotic expressions (35), (36), (37). In detail, the asymptotic calculating unit 17' is similar to the construction shown in FIG. 8 and is comprised as shown in FIG. 17, of three similarity measure registers 173', 174', 175', a comparator 171', an adder 172', and three path registers 176', 177', 178'. Three similarly measure D(v, n), D(V, n−1), D(v, n−2) and three path informations F(v, n), F(v, n−1), F(v, n−2) are read out of the similarity measure memory 18' and the path memory 19' according to the signal $n_4$ indicating a time point n of the reference pattern and signals $n_{41}$ and $n_{42}$ indicating time points (n−1) and (n−2) which are issued from the control unit 10, and they are stored in the similarity measure registers 173'~175' and the path registers 176'~178' respectively. The comparator 171' detects a minimum value from the three similarity measure registers 173'~175' and issues a gate signal ñ for selecting a path register corresponding to a similarity measure register whereby the minimum value is obtained. A content of the path register selected according to the gate signal ñ is stored in the path memory 19' as F(v, m). Then, a minimum similarity measure value D(v, n) from the comparator 171' is added to a distance $d(a_m, b_n^v)$ from the distance calculating unit 15 through the adder 172' and stored in the similarity measure memory 18'.

The asymptotic calculation is carried out from $n = N^v$ to 1, and the similarity measure $D(v, N^v)$ is computed for each v.

Figure 18:
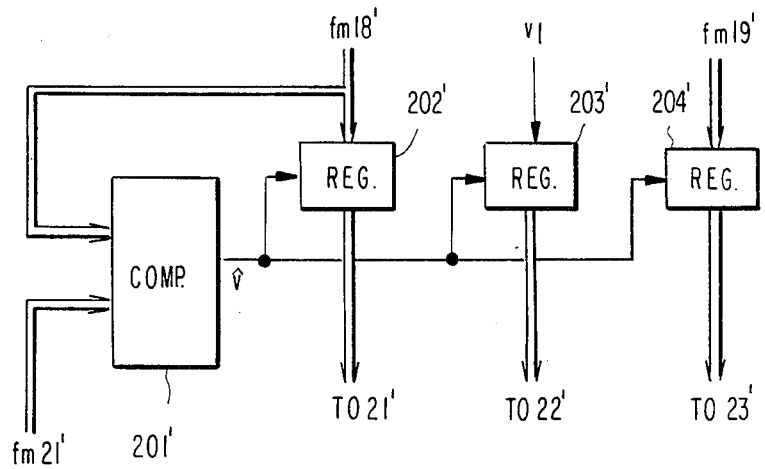
FIG. 18 is a block diagram representing the composition of a digit similarity measure calculating unit 20' in FIG. 13.

A digit similarity measure calculating unit 20' performs processing of the expressions (38), (39), (40), to obtain minimum values of V from the similarity measures $D(v, N^v)$ one after another. Namely, as shown in FIG. 18, the digit similarity measure calculating unit 20' is comprised of a comparator 201, a register 202' to hold the similarity measure $D(v, N^v)$, a register 203' to hold a category v indicated by the signal $v_1$ to which a reference word pattern belongs, and a register 204' to hold the path information $F(v, N^v)$. The similarity measure $D(v, N^v)$ and the path information $F(v, N^v)$ read out of the similarity measure memory 18' and the path memory 19' according to a signal $n_1$ generated from the control unit 10 are stored in the registers 202' and 204' respectively, and the category v to which the reference work pattern belongs is stored in the register 203'. The comparator 201' compares the similarity measure D(v, $N^v$) with a digit similarity measure DB(m) read out of the digit similarity measure memory 21' and then generates a gate signal v̂ if $D(v, N^v)$ is less than DB(m). The similarity measure $D(v, N^v)$, the category v, and the path information $F(v, N^v)$ held in the registers 202', 203', and 204' are stored in the digit similarity measure memory 21' as DB(m), the digit recognition category memory 22' as W(m), and the digit path memory 23' as FB(m) respectively according to the gate signal v.

Further, an initialization shown in the expressions (33), (34) for the similarity measure calculation in a vertical string is carried out according to a signal $n_5$ indicating a time point 0 of the reference pattern which is issued from the control unit 10 and a signal $m_4$ specifying a time point (m−1) one previous time point m of the input pattern. DB(m−1) is read out of the digit similarity measure memory 21' and stored in the similarity measure memory 18' as D(v, o). Then, a signal $m_d$ indicating the address value specified by the signal $m_4$ is supplied to the path information memory 19' from the control unit 10. A value (m−1) indicated by the signal $m_d$ as F(v, o) is stored in the path memory 19' at the address specified by the signals $v_1$, $n_4$.

Figure 19:
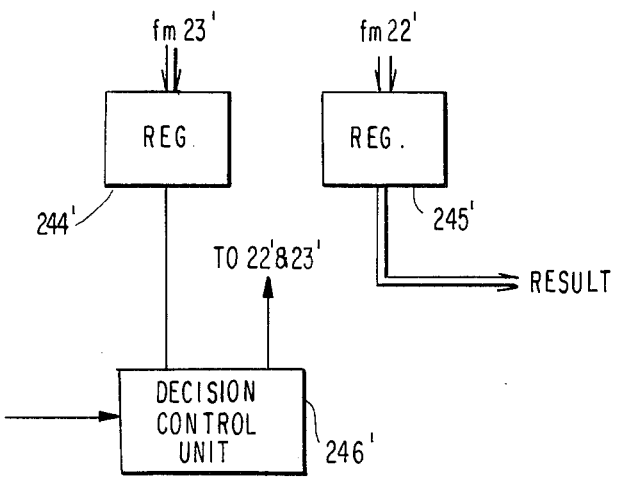
FIG. 19 is a block diagram representing the composition of a decision unit 24' in FIG. 13.

A decision unit 24' carries out processing given in the expressions (41), (42), and generates a recognized result R(l) on each digit of the input pattern based on the digit path information FB(m) and the digit recognition category W(m). The decision unit 24' is comprised, as shown in FIG. 19, of a register 244' to hold a digit path information F(m), a register 245' to hold a recognized result, and a decision control unit 246'. Upon detection of the end of a speech in the input unit 11, the control unit 10 issues a signal DST for starting the above processing on decision to the decision unit 24' in response to the signal SP. After receipt of the signal DST, a decision control unit 246' issues an address signal m₂ as m=M to the digit path memory 23' and the digit recognition category memory 22' to read out FB(M) and W(M), and they are stored in the register 244' and the register 245'. The contents of the register 245' are outputted as a recognized result. Further, the decision control unit 246' issues the address signal m₂ as m=(value stored in the register 244') to the digit path memory 23' and the digit recognition category memory 22', FB(m) and W(m) are read and then stored in the register 244' and the register 245'. The recognized results are outputted from the register 245' by repeating the processing sequentially from m=M to m=0.

Figure 20B:
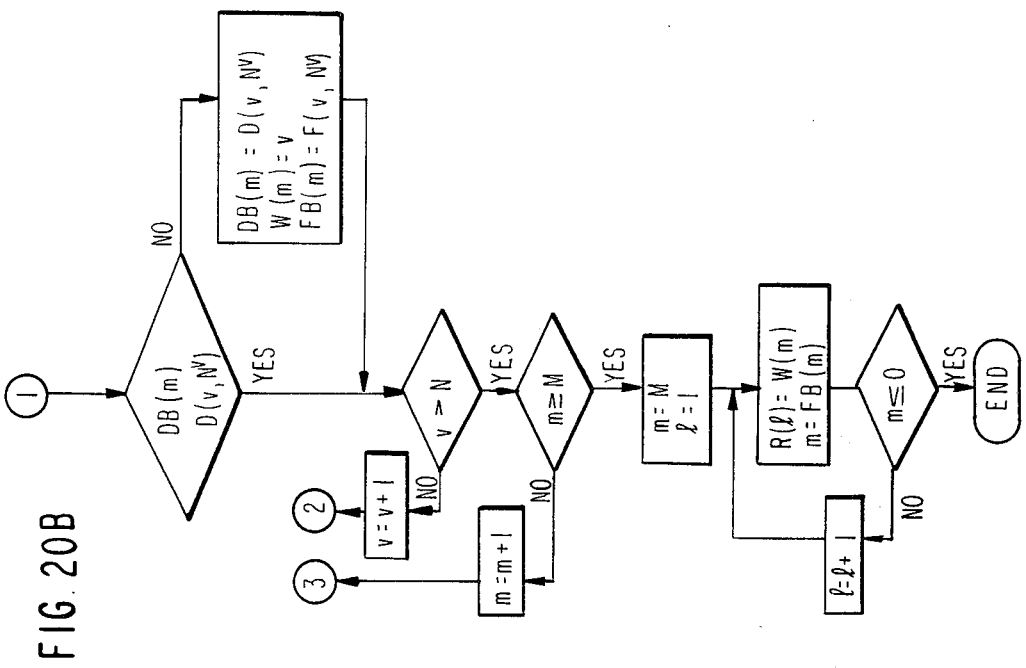
FIGS. 20A and 20B are flowcharts showing processing procedures of the further embodiment of this invention.
Figure 20A:
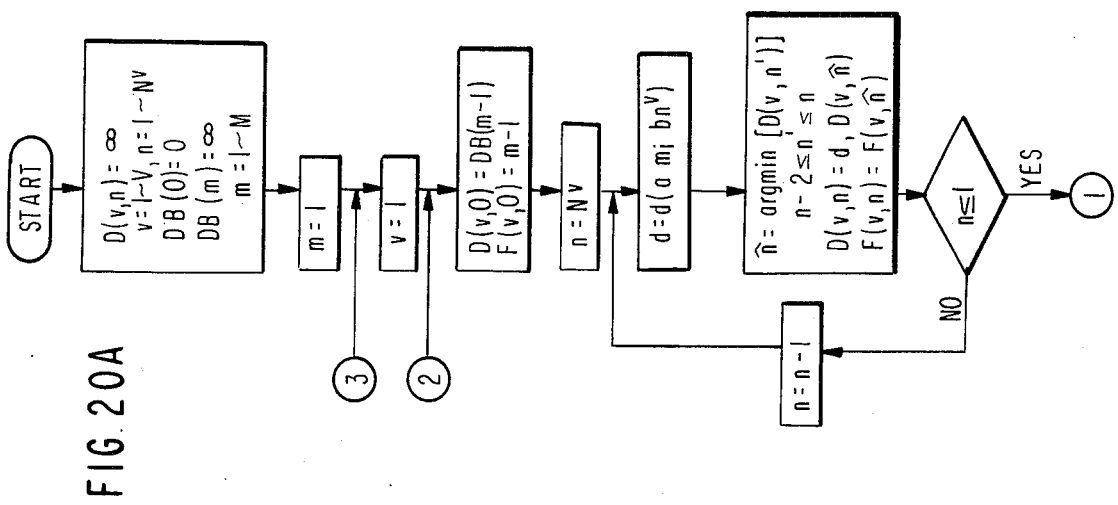

Procedures for the above processing of a system according to this embodiment are shown in flowchart in FIG. 20A and FIG. 20B.

The principle and its concrete examples are described as above, however, the description refers only to examples of the present invention and hence the invention may be practiced variously otherwise than as specifically illustrated and described. For example, it is apparent that the order of a calculating loop for recognition processing can be arranged as l, n, v, m instead of n, l, v, m so given according to this disclosure.

Further, while the distance between the input vector $a_m$ and the reference $b_n^v$ has been described by means of Chebyshev distance scale like the expression (3), Euclid distance like the expression (43) or inner product like the expression (44) can be used instead.

$$d(m, n) = \sum_{r=1}^{R} (a_{mr} - b_{nr}^v)^2 \qquad (43)$$

$$d(m, n) = \sum_{r=1}^{R} (a_{mr} \times b_{mr}^v) \qquad (44)$$

Then, the expression (4) is a fundamental asymptotic expression for DP matching, however, the asymptotic expression proposed in a paper "Dynamic Programming Algorithm Optimization for Spoken Word Recognition," IEEE Translation on Acoustics, Speech and Signal Processing Vol. ASSP-26, No. 1, Feb. 1978, pp. 43–49 is also effective for prevention of erroneous recognitions. In this paper there are provided techniques to remove a probability of unnatural deformation of the matching path by providing an inclination limitation on the matching path. An asymptotic expression given in the following expression (45) as example is that for removing the probability of a horizontal matching path.

$$D_m(l, v, n) = d_m(n) + \min \begin{cases} d_{m-1}(n) + D_{m-2}(l, v, n-1) \\ D_{m-1}(l, v, n-1) \\ D_{m-1}(l, v, n-2) \end{cases} \qquad (45)$$

$$\hat{n} = \operatorname{argmin} \begin{cases} d_{m-1}(n) + D_{m-2}(l, v, n-1) \\ D_{m-1}(l, v, n-1) \\ D_{m-1}(l, v, n-2) \end{cases}$$

$$\hat{m} = \operatorname{argmin} \begin{cases} d_{m-1}(n) + D_{m-2}(l, v, n-1) \\ D_{m-1}(l, v, n-1) \\ D_{m-1}(l, v, n-2) \end{cases}$$

The path information in this case can be expressed by $$F_m(l, v, n) = F_{\hat{m}}(l, v, n) \qquad (46)$$

An asymptotic expression given in the expressions (45) and (46) whereby an appreciated value of the distance between time points (m, n) and (m−1, n−2) will be obtained more precisely with a value midway along the path taken into consideration can be applied as another example.

$$D_m(l, v, n) = \min \begin{cases} D_{m-2}(l, v, n-1) + d_{m-1}(n) + d_m(n) \\ D_{m-1}(l, v, n-1) + d_m(n) \\ D_{m-1}(l, v, n-2) + (d_m(n-1) + d_m(n))/2 \end{cases} \qquad (47)$$

$$\hat{n} = \operatorname{argmin} \begin{cases} D_{m-2}(l, v, n-1) + d_{m-1}(n) + d_m(n) \\ D_{m-1}(l, v, n-1) + d_m(n) \\ D_{m-1}(l, v, n-2) + (d_m(n-1) + d_m(n))/2 \end{cases}$$

$$\hat{m} = \operatorname{argmin} \begin{cases} D_{m-2}(l, v, n-1) + d_{m-1}(n) + d_m(n) \\ D_{m-1}(l, v, n-1) + d_m(n) \\ D_{m-1}(l, v, n-2) + (d_m(n-1) + d_m(n))/2 \end{cases}$$

The path information in this case can be expressed by the expression (48)

$$F_m(l, v, n) = F_{\hat{m}}(l, v, n) \qquad (48)$$

It goes without saying that the asymptotic expression can be applied to the embodiment of this invention shown in FIG. 13 by removing the digit information l in the above each example.

What is claimed is:

1. A continuous speech recognition system for recognizing an input speech composed of a plurality of continuously spoken words comprising:
   a speech analyzing means for analyzing an input signal at every given frame time point m and outputting an input pattern expressed in a time series of a feature vector consisting of a predetermined number of feature parameters;
   an input pattern memory to store said input pattern;
   a reference pattern memory to store a reference pattern consisting of said feature vector in the same format as said input pattern for each of plurality (V) of predetermined words to be recognized;

a distance calculating means to calculate the distance between the feature vector of said input pattern at a time point m and the feature vector of the reference pattern of the v-th words at a time point n under a predetermined distance formula by changing the time point n of the reference pattern of the v-th word in an arbitrary order from the start point to end point $N^v$ while changing the reference pattern v from the first word to end word V for each time point m of the input pattern, said each time point m changing from the start point to an end point M;

an asymptotic calculating means to calculate a similarity measure D(v, n) given by the cumulative sum of said distances at said time points n and path information F(v, n) indicating a time point of the input pattern at the start point of said v-th reference pattern on a path through which said similarity measure D(v, n) has been obtained by a predetermined asymptotic expression according to a dynamic programming process while changing the time point n of the reference pattern of the v-th word in an arbitrary order from the start point to end point $N^v$ and while changing the reference pattern v from the first word to end word for each time point m of the input pattern, said each time point m changing from the start point to end point M;

a digit similarity measure and digit path information calculating means to select a minimum similarity measure from among the similarity measures at the end time points of reference patterns of all the words obtained through said asymptotic calculating means, and to provide said minimum similarity measure as a digit similarity measure DB(m), a category to which the word corresponding to said minimum similarity measure belongs as a digit recognition category W(m)=v, and path information corresponding to said minimum similarity measure as a digit path information FB(m) at said time point m, for each time point m of the input pattern, said time point m changing from the start point to end point M;

an initializing means to give digit similarity measure DB(m−1) as an initial value of similarity measure and to give a time point (m−1) as an initial value of said path information at a time point m while changing the time point m of the input pattern from the start point to end point M;

a decision means to obtain a recognized result at a final digit from said digit recognition category W(M) at the end point M of said input pattern, to obtain an end point of said input pattern on the digit previous to the final digit by one from said digit path information at the end point M, to obtain a recognized result on the digit previous to said final digit by one from said digit recognition category at the end point, and to obtain a recognized result at each digit sequentially toward the start point of said input pattern.

2. A continuous speech recognition system for recognizing an input speech composed of a plurality of continuously spoken words comprising:

a speech analyzing means for analyzing an input signal at every given frame time point m and outputting an input pattern expressed in a time series of a feature vector comprising a predetermined number of feature parameters;

an input pattern memory to store said input pattern;

a reference pattern memory to store a reference pattern comprising a feature vector in the same format as said input pattern for each of a plurality (V) of predetermined words to be recognized;

a distance calculating means to calculate the distance between the feature vector of said input pattern at a time point m and the feature vector of the reference pattern of the v-th word at a time point n at every time point n under a predetermined distance formula by changing the time point n of the reference pattern of the v-th word in an arbitrary order from the start point to end point $N^v$ while changing the reference pattern V from the first word to end word V for each time point to end point M;

an asymptotic calculating means to calculate a similarity measure D(l, v, n) given by the cumulative sum of said distances on the l-th digit at said time points n and a path information F(l, v, n) indicating a time point of the input pattern at the start point of said v-th reference pattern on a path through which said similarity measure D(l, v, n) has been obtained by a predetermined asymptotic expression according to a dynamic programming process while changing the time point n of the reference pattern of the v-th word in an arbitrary order from the start point to end point $N^v$, while changing digit number l from one to L, and while changing the reference pattern v from the first word to the end word V for each time point m of the input pattern, said time point m changing from the start point to end point M;

a digit similarity measure and digit path information calculating means to select a minimum similarity measure from among the similarity measures at the end time points of the reference patterns of all the words on the l-th digit obtained through said asymptotic calculating means, and to provide said minimum similarity measure as a digit similarity measure DB(l, m), a category to which the word corresponding to said minimum similarity measure belongs as a digit recognition category W(l, m)=v, and path information corresponding to said minimum similarity measure as a digit path information FB(l, m) on said digit l at said time point m while changing digit number l from one to L for each time point m of the input pattern, said each time point m changing from the start point to end point M;

an initializing means to give said digit similarity measure DB (l-1, m-1) as an initial value of said similarity measure at a time point (m-1) and to give time point (m-1) as an initial value of said path information at a time point m while changing the line point m of the input pattern from the start point to end point M;

a decision means to obtain a final digit from said similarity measure DB(l, m), to obtain a recognized result at said final digit from said digit recognition category W(l, M), at the end point M of said input pattern, to obtain an end point of said input pattern on the digit previous to the final digit by one from said digit path information at the end point M, to obtain a recognized result of the digit prior to said final digit by one from said digit recognition category at the end point, and to obtain a recognized result at each digit sequentially toward the start point of said input pattern.

3. A continuous speech recognition system according to claim 1, wherein said arbitrary order in the asymptotic calculating means is an order in which said calculation is carried out by decreasing by one sequentially from $N^v$.

4. A continuous speech recognition system according to claim 1, wherein said distance formula is any of Chebyshev distance, Euclid distance or inner product distance.

5. A continuous speech recognition system according to claim 1, wherein said asymptotic expression is $$D_m^{(v,n)} = d(n) + \min \begin{cases} D_{m-1}^{(v,n)} \\ D_{m-1}^{(v,n-1)} \\ D_{m-1}^{(v,n-2)} \end{cases}$$

where $D_{m-1}(v, n)$ denotes the similarity measure between a reference pattern of the v-th word at a time point n and the input pattern at a time point (m-1).

6. A continuous speech recognition system according to claim 1, wherein said predetermined asymptotic expression is $$D_m(v, n) = d_m(n) + \min \begin{cases} d_{m-1}(n) + D_{m-2}(v, n-1) \\ D_{m-1}(v, n-1) \\ D_{m-1}(v, n-2) \end{cases}$$

7. A continuous speech recognition system according to claim 1, wherein said asymptotic expression is $$D_m(l, v, n) = \min \begin{cases} D_{m-2}(v, n-1) + d_{m-1}(n) + d_m(n) \\ D_{m-1}(v, n-1) + d_m(n) \\ D_{m-1}(v, n-2) + (d_m(n-1) + d_m(n))/2 \end{cases}$$

8. A continuous speech recognition system according to claim 2, wherein a limitation is given to the time points of said reference pattern and input pattern by a window function.

9. A continuous speech recognition system according to claim 2, wherein said distance calculation in said distance calculating means is carried out on one digit only.

10. A continuous speech recognition system according to claim 1, wherein said distance calculating means comprises an absolute value circuit to output the absolute value of the difference between the feature parameter comprising said input pattern and the feature parameter comprising said reference pattern, an adder circuit with an input being an output of the absolute value circuit, and a register to store the output of said adder circuit and also to output the stored contents to the other input of said adder circuit.

11. A continuous speech recognition system according to claim 1, wherein said asymptotic calculating means is provided with a plurality of similarity measure registers to store similarity measures at predetermined plural time points n, a plurality of path information registers to store path information at said predetermined plural time points n, a comparator to select and output a minimum value from among the values stored in said plurality of similarity measure registers and also to output a signal indicating a time point n corresponding to said selected similarity measure stored in the similarity measure register, an adder to output an added result as a similarity measure obtained newly with said minimum similarity measure as one input and the distance information obtained through said distance calculating means as another input, and means to output the contents stored in said path information register corresponding to said time point n s a new path information.

12. A continuous speech recognition system according to claim 1, wherein said digit similarity measure and digit path information calculating means comprises a first register to hold a word similarity measure at the end of said reference word pattern, a second register to hold the category to which the word corresponding to the word similarity measure held in the first register belongs, a third register to hold the path information corresponding to the word similarity measure held in said first register, and a comparator to compare the word similarity measure read out of said first register with a word similarity measure obtained currently, to select the smaller similarity measure and write it in said first register, and to write the category and the path information coresponding to said selected similarity measure in said second and third registers respectively.

13. A continuous speech recognition system according to claim 1, wherein said decision means is provided with a first register to hold said digit path information, a second register to hold a recognized result, and a decision control means to output an address signal indicating the time point of said input pattern by changing the time point sequentially in a decreasing direction from M after the end point M of said input pattern has been detected, to store the digit path information and the recognized result at the time point of said corresponding input pattern in said first and second registers, and repeating the operation to output a signal indicating the time point of the input pattern held in said first register as said address signal.

14. A continuous speech recognition system according to claim 2, wherein said decision means is provided with a comparator to compare one input of the digit similarity measure on each digit at the end point M of said input pattern sequentially with another input, and to output the lesser similarity measure, a first register to hold the output of said comparator and also to output the contents held therein to the other input of said comparator, a second register to hold a digit of said digit similarity measure, a third register to hold said digit path information, a fourth register to hold a recognized result, and a decision control means to output an address signal indicating the time point of said input pattern by changing it sequentially in a decreasing direction from M after the end point M of said input pattern has been detected, to store the digit path information and the recognized result corresponding to the time point of said input pattern in said third and fourth registers, and to an operation to output a signal indicating the time point of the input pattern held in said third register as said address signal and another signal indicating one previous digit.

15. A continuous speech recognition system according to claim 2, wherein said arbitrary order in the asymptotic calculating means is an order in which said calculation is carried out by decreasing by one sequentially from $N^v$.

16. A continuous speech recognition system according to claim 2, wherein said distance formula is any of Chebyshev distance, Euclid distance or inner product distance.

17. A continuous speech recognition system according to claim 2, wherein said asymptotic expression is $$D_m^{(v,n)} = d(n) + \min \begin{cases} D_{m-1}^{(v,n)} \\ D_{m-1}^{(v,n-1)} \\ D_{m-1}^{(v,n-2)} \end{cases}$$

wherein $D_{m-1}(v, n)$ denotes the similarity measure between the reference pattern of the v-th word at a time point n and the input pattern at a time point (m-1).

18. A continuous speech recognition system according to claim 2, wherein said predetermined asymptotic expression is $$D_m(v, n) = d_m(n) + \min \begin{cases} d_{m-1}(n) + D_{m-2}(v, n - 1) \\ D_{m-1}(v, n - 1) \\ D_{m-1}(v, n - 2) \end{cases}$$

19. A continuous speech recognition system according to claim 2, wherein said asymptotic expression is $$D_m(l, v, n) = \min \begin{cases} D_{m-2}(v, n - 1) + d_{m-1}(n) + d_m(n) \\ D_{m-1}(v, n - 1) + d_m(n) \\ D_{m-1}(v, n - 2) + (d_m(n - 1) + d_m(n))/2 \end{cases}$$

20. A continuous speech recognition system according to claim 2, wherein said distance calculating means comprises an absolute value circuit to output the absolute value of the difference between the feature parameter comprising said input pattern and the feature parameter comprising said reference pattern, an adder circuit with an input being an output of the absolute value circuit, and a register to store the output of said adder circuit and also to output the stored contents to the other input of said adder circuit.

21. A continuous speech recognition system according to claim 2, wherein said asymptotic calculating means is provided with a plurality of similarity measure registers to store similarity measures at predetermined plural time points n, a plurality of path information registers to store path information at said predetermined plural time points n, a comparator to select and output a minimum value from among the values stored in said plurality of similarity measure registers and also to output a signal indicating a time point n corresponding to said selected similarity measure stored in the similarity measure register, an adder to output an added result as a newly obtained similarity measure with said minimum similarity measure as one input and the distance information obtained through said distance calculating means as another input, and means to output the contents stored in said path information register corresponding to said time point n as new path information.

22. A continuous speech recognition system according to claim 2, wherein said digit similarity measure and digit path information calculating means comprises a first register to hold a word similarity measure at the end of said reference word pattern, a second register to hold the category to which the word corresponding to the word similarity measure held in the first register belongs, a third register to hold the path information corresponding to the word similarity measure held in said first register, and a comparator to compare the word similarity measure read out of said first register with a word similarity measure obtained currently to, select the smaller similarity measure and write it in said first register, and to write the category and the path information corresponding to said selected similarity measure in said second and third registers respectively.

23. A continuous speech recognition system according to claim 2, wherein said decision means is provided with a first register to hold said digit path information, a second register to hold a recognized result, and a decision control means to output an address signal indicating the time point of said input pattern by changing the time point sequentially in a decreasing direction from M after the end point M of said input pattern has been detected, to store the digit path information and the recognized result at the time point of said corresponding input pattern in said first and second register, and to repeat the operation to output a signal indicating the time point of the input pattern held in said first register as said address signal.

* * * * *

UNITED STATES PATENT AND TRADEMARK OFFICE
CERTIFICATE OF CORRECTION

Page 1 of 11

PATENT NO. : 4,592,086
DATED : May 27, 1986
INVENTOR(S) : Masao Watari et al

It is certified that error appears in the above-identified patent and that said Letters Patent is hereby corrected as shown below:

Column 4, line 16, delete "D(1, v, n)", insert --D($\ell$, v, n)--, and delete "F(1, v, n)", insert --F($\ell$, v, n)--;

line 19, delete "DB(1, m)", insert --DB($\ell$, m)--;

line 20, delete "FB(1, m)", insert --FB($\ell$, m)--, and delete "W(1, m)", insert --W($\ell$, m)--.

Column 5, line 23

Delete "$b_n^V = b_{n1}^V, b_{n2}^V, \ldots, b_{nr}^V, \ldots, b_nR^V$" and insert --$b_n^V = b_{n1}^V, b_{n2}^V, \ldots, b_{nr}^V, \ldots, b_{nR}^V \ldots$ --;

line 28, delete "$b_n^V$" and insert

--$b_n^V$--;

line 31, delete "=$D(a_m, b_n^V)$=" and insert

--=$D(a_m, b_n^V)$=--;

line 67, delete "number 1", insert --number $\ell$--;

Column 6, In the following lines, all occurrences, please change "1" to --$\ell$--;

lines 21, 23, 25, 26, 28, 29, 30, 33, 35, 36, 38, and 40 51, 52, 53, 66.

UNITED STATES PATENT AND TRADEMARK OFFICE
CERTIFICATE OF CORRECTION

PATENT NO. : 4,592,086         Page 2 of 11
DATED : May 27, 1986
INVENTOR(S) : Masao Watari et al It is certified that error appears in the above-identified patent and that said Letters Patent is hereby corrected as shown below:

lines 41, 42, delete "DB(1-1, m-1)", insert --"DB($\ell$-1, -1),--;

line 48 & 50, delete "digit 1", insert --digit $\ell$--;

line 68, delete "1 = 1 ~ Lmax, v = 1 ~ V, n = 1 ~ $N^V$", insert "$\ell$ = 1 ~ Lmax, v = 1 ~ V, n = 1 ~ $N^V$";

Column 7, In the following lines, all occurrences, please change "1" to --$\ell$--;

lines 2, 4, 25, 27, 31, 49, 52, 53, 54, 55, 57, 58, 59 60, 63, 67, 69.

Column 7, line 13 delete "$b_n^V$" and insert --$b_n^V$-- line 18, delete "D(1, v, 0) = DB(1-1, m-1)", insert --D($\ell$, v, 0) = DB($\ell$-1, m-1)--;

line 20, delete "F(1, v, 0) = m-1", insert --F($\ell$, v, 0) = m-1--;

Column 8, In the following lines, all occurrences, please change "1" to --$\ell$--;

lines 2, 12, 13, 16, 23, 29, 31, 41, 45, 47.

line 42, delete "(1-1)-th", insert --($\ell$-1)-th--;

UNITED STATES PATENT AND TRADEMARK OFFICE
CERTIFICATE OF CORRECTION

PATENT NO. : 4,592,086            Page 3 of 11

DATED : May 27, 1986

INVENTOR(S) : Masao Watari et al

It is certified that error appears in the above-identified patent and that said Letters Patent is hereby corrected as shown below:

Column 9, line 8, delete "$Cl_1$, DST, $m_1$, $v_1$, $n_1$, r, $Cl_2$, $1_1$, $n_3$, $n_2$, $m_{21}$, $n_{22}$, $m_3$, $1_2$, etc.", insert --$C\ell_1$, DST, $m_1$, $v_1$, $n_1$, r, $C\ell_2$, $\ell_1$, $n_3$, $n_2$, $m_{21}$, $n_{22}$, $m_3$, $\ell_2$, etc.--;

line 52, delete "$b_{nr}^{\phantom{nr}V}$" and insert --$b_{nr}^V$--, delete "$bn^V$", insert --$b_n^V$;

line 57, delete "$b_{nr}^{\phantom{nr}V}$," and insert --$b_{nr}^V$,--;

line 68, delete "$Cl_2$", insert --$C\ell_2$--.

Column 10, line 3, delete "$a_{mr}$-$b_{nr}^{\phantom{nr}V}$" and insert --$a_{mr}$-$b_{nr}^V$--;

line 4, delete "$a_{mr}$ and $bnr^V$", insert --$a_{mr}$ and $b_{nr}^V$-- line 17, delete "$Cl_1$", insert --$C\ell_1$--;

Column 10, In the following lines, all occurrences, please change "1" to --$\ell$--;

lines 22, 35, 48, 49, 53, 56, 57, 61, 65;

line 36, delete "D(1, v, n-2)", insert --D($\ell$, v, n-2)-- and delete "F(1, v, n)", insert --F($\ell$, v, n)--;

line 37, delete "F(1, v, n-1) and F(1, v, n-2)", insert --F($\ell$, v, n-1) and F($\ell$, v, n-2)--;

UNITED STATES PATENT AND TRADEMARK OFFICE
CERTIFICATE OF CORRECTION

PATENT NO. : 4,592,086

DATED : May 27, 1986

INVENTOR(S) : Masao Watari et al

Page 4 of 11

It is certified that error appears in the above-identified patent and that said Letters Patent is hereby corrected as shown below:

line 68, delete "F(1, v, $N^v$).", insert --F($\ell$, v, $N^v$).-- delete "$1_1$", insert --$\ell^1$--.

Column 11, In the following lines, all occurrences, please change "1" to --$\ell$--;

lines 3, 5, 11, 12, 13, 14, 15, 17, 18, 19, 21, 37, 41, 42, 43, 47, 54, 56, 59, 62, 64;

line 25, delete "$1_1$", insert --$\ell_1$--;

lines 29-30, delete "DB(1-1, m-1)", insert --DB($\ell$-1, m-1)--, delete "$1_2$", insert --$\ell_2$--;

line 33, delete "signals 1", insert --signals $\ell$--, delete "D(1, v, o).", insert --D($\ell$, v, o).--;

line 38, delete "signals $1_1$,", insert --signals $\ell_1$,--.

Column 12, In the following lines, all occurrences, please change "1" to --$\ell$--;

lines 1, 2, 7, 22, 24, 27, 63, 66, 67;

line 5, delete "issues 1 = 1-1,", insert --$\ell$ = $\ell$-1--;

line 8, delete "FB(1, m) and W(1, m)", insert --FB($\ell$, m) and W($\ell$, m)--;

line 65, delete "1-th", insert --$\ell$-th--.

UNITED STATES PATENT AND TRADEMARK OFFICE
CERTIFICATE OF CORRECTION

PATENT NO. : 4,592,086
DATED : May 27, 1986
INVENTOR(S) : Masao Watari et al

It is certified that error appears in the above-identified patent and that said Letters Patent is hereby corrected as shown below:

Column 13, In the following lines, all occurrences, please change "1" to --$\ell$--;

lines 36, 44, 45, 58 line 2, delete "$S_L^1(A', C_L^1)$", insert --$S_L^\ell(A', C_L^\ell)$--;

lines 4 & 5, delete "$C_L^1 = B^{v1}, B^{v1+1}, \ldots, B^{v1+L}$", insert --$C_L^\ell = B^{v\ell}, B^{v\ell+1}, \ldots, B^{v\ell+L}$--;

line 7, delete "$S_L^1(A', C_L^1)$", insert --$S_L^\ell(A', C_L^\ell)$--;

line 17, delete "$S_{\hat{L}}^{1}(A', C_L^1) = \min_L S_L^{1}(A', C_L^1)$", insert --$S_{\hat{L}}^{\ell}(A', C_{\hat{L}}^{\ell}) = \min_L S_L^{\ell}(A', C_L^{\ell})$--;

line 20, delete "$\hat{L} = \mathrm{argmin}\, S_L^{1}(A', C_L^1)$", insert --$\hat{L} = \mathrm{argmin}\, S_L^{\ell}(A', C_L^{\ell})$--;

line 22, delete "$C_L^1 = B^{\hat{v}1}, B^{\hat{v}1+1}, \ldots B^{\hat{v}1+L}$", insert --$C_{\hat{L}}^{\ell} = B^{\hat{v}\ell}, B^{\hat{v}\ell+1}, \ldots B^{\hat{v}\ell+L}$--;

UNITED STATES PATENT AND TRADEMARK OFFICE
CERTIFICATE OF CORRECTION

PATENT NO. : 4,592,086

DATED : May 27, 1986

INVENTOR(S) : Masao Watari et al

Page 6 of 11

It is certified that error appears in the above-identified patent and that said Letters Patent is hereby corrected as shown below:

line 24, delete "$X_{1+1}$", insert --$X_{\ell+1}$--;

line 25, delete "$E_{1+1+L}$", insert --$E_{\ell+1+L}$--;

line 26, delete "$S_L^{1+1}(A1, C_L^{1+1})$", insert --$S_L^{\ell+1}(A1, C_L^{\ell+1})$--;

line 28, delete "$C_L^{1+1} = B^{v1}+1, B^{v1+2}, \ldots, B^{v1+1+L},$", insert --$C_L^{\ell+1} = B^{v\ell}+1, B^{v\ell+2}, \ldots, B^{v\ell+1+L},$--;

line 29, delete "where $C_L^{1+1}$", insert --where $C_L^{\ell+1}$--;

line 32, delete "$S_L^{1+1}(A', C_L^{1+1})=S_L^{1+1}(A', C_L^1)=S_L^1(A', C_L^1)$", insert --$S_L^{\ell+1}(A', C_L^{\ell+1})=S_L^{\ell+1}(A', C_L^{\ell})=S_L^{\ell}(A', C_L^{\ell})$--;

line 34, delete "$X_{1+1}$", insert --$X_{\ell+1}$--;

line 35, delete "$E_{1+1+L}$", insert --$E_{\ell+1+L}$--;

line 41, delete "$C_L^1$", insert --$C_L^{\ell}$--;

line 52, delete "$= \min S(A'', C1'') + S_{\mathcal{L}}^1 A', C_{\mathcal{L}}^1)$", insert --$= \min S(A'', C_{\ell}'') + S_{\mathcal{L}}^{\ell}(A', C_{\mathcal{L}}^{\ell})$--;

UNITED STATES PATENT AND TRADEMARK OFFICE
CERTIFICATE OF CORRECTION

PATENT NO. : 4,592,086

DATED : May 27, 1986

INVENTOR(S) : Masao Watari et al

Page 7 of 11

It is certified that error appears in the above-identified patent and that said Letters Patent is hereby corrected as shown below:

line 61, delete "$C_L^1$", insert --$C_L^\ell$--;

Column 14, line 41, delete "+D(v, n)", insert --+D(v, $\hat{n}$)--;

Column 14, line 43, delete "F(v, n) = F(v, n)", insert --F(v, n) = F(v, $\hat{n}$)--.

Column 15, In the following lines, all occurrences, please change "1" to --$\ell$--;

lines 21, 25, 39.

line 61, delete "$C1_1$", insert --$C\ell_1$--;

Column 16, line 21, delete "d($a_m$, $b_n^V$)", insert --d($a_m$, $b_n^V$)--

Column 17, In the following lines, all occurrences, please change "1" to --$\ell$--;

lines 3, 39.

line 42, delete "$bn^V$", insert --$b_n^V$--.

UNITED STATES PATENT AND TRADEMARK OFFICE
CERTIFICATE OF CORRECTION

PATENT NO. : 4,592,086     Page 8 of 11
DATED : May 27, 1986
INVENTOR(S) : Masao Watari et al It is certified that error appears in the above-identified patent and that said Letters Patent is hereby corrected as shown below:

Column 18, lines 1-16 delete $$"D_m(1, v, n) = d_m(n) + \min \begin{cases} d_{m-1}(n) + D_{m-2}(1, v, n-1) \\ D_{m-1}(1, v, n-1) \\ D_{m-1}(1, v, n-2) \end{cases}"$$

insert $$--D_m(\ell, v, n) = d_m(n) + \min \begin{cases} d_{m-1}(n) + D_{m-2}(\ell, v, n-1) \\ D_{m-1}(\ell, v, n-1) \\ D_{m-1}(\ell, v, n-2) \end{cases}--$$

delete $$"\hat{n} = \operatorname{argmin} \begin{cases} d_{m-1}(n) + D_{m-2}(1, v, n-1) \\ D_{m-1}(1, v, n-1) \\ D_{m-1}(1, v, n-2) \end{cases}"$$

insert $$--\hat{n} = \operatorname{argmin} \begin{cases} d_{m-1}(n) + D_{m-2}(\ell, v, n-1) \\ D_{m-1}(\ell, v, n-1) \\ D_{m-1}(\ell, v, n-2) \end{cases}--$$

UNITED STATES PATENT AND TRADEMARK OFFICE
CERTIFICATE OF CORRECTION

PATENT NO. : 4,592,086  Page 9 of 11
DATED : May 27, 1986
INVENTOR(S) : Masao Watari et al It is certified that error appears in the above-identified patent and that said Letters Patent is hereby corrected as shown below:

delete $$"\hat{m} = \mathrm{argmin} \begin{cases} d_{m-1}(n) + D_{m-2}(1, v, n-1) \\ D_{m-1}(1, v, n-1) \\ D_{m-1}(1, v, n-2) \end{cases}"$$

insert $$--\hat{m} = \mathrm{argmin} \begin{cases} d_{m-1}(n) + D_{m-2}(\ell, v, n-1) \\ D_{m-1}(\ell, v, n-1) \\ D_{m-1}(\ell, v, n-2) \end{cases} --$$

line 21, delete "$F_m(1, v, n) = F_m(1, v, n)$", insert $--F_{\hat{m}}(\ell, v, \hat{n}) = F_{\hat{m}}(\ell, v, \hat{n})--$;

lines 30-45, delete $$"D_m(1, v, n) = \min \begin{cases} D_{m-2}(1, v, n-1) + d_{m-1}(n) + d_m(n) \\ D_{m-1}(1, v, n-1) + d_m(n) \\ D_{m-1}(1, v, n-2) + (d_m(n-1) + d_m(n)/2 \end{cases}"$$

insert $$--D_m(\ell, v, n) = \min \begin{cases} D_{m-2}(\ell, v, n-1) + d_{m-1}(n) + d_m(n) \\ D_{m-1}(\ell, v, n-1) + d_m(n) \\ D_{m-1}(\ell, v, n-2) + (d_m(n-1) + d_m(n))/2 \end{cases} --$$

UNITED STATES PATENT AND TRADEMARK OFFICE
CERTIFICATE OF CORRECTION

PATENT NO. : 4,592,086

DATED : May 27, 1986

INVENTOR(S) : Masao Watari et al

Page 10 of 11

It is certified that error appears in the above-identified patent and that said Letters Patent is hereby corrected as shown below:

delete $$"\hat{n} = \mathrm{argmin} \begin{cases} D_{m-2}(1, v, n-1) + d_{m-1}(n) + d_m(n) \\ D_{m-1}(1, v, n-1) + d_m(n) \\ D_{m-1}(1, v, n-2) + (d_m(n-1) + d_m(n))/2 \end{cases}"$$

insert $$--\hat{n} = \mathrm{argmin} \begin{cases} D_{m-2}(\ell, v, n-1) + d_{m-1}(n) + d_m(n) \\ D_{m-1}(\ell, v, n-1) + d_m(n) \\ D_{m-1}(\ell, v, n-2) + (d_m(n-1) + d_m(n))/2 \end{cases}--$$

delete $$"\hat{m} = \mathrm{argmin} \begin{cases} D_{m-2}(1, v, n-1) + d_{m-1}(n) + d_m(n) \\ D_{m-1}(1, v, n-1) + d_m(n) \\ D_{m-1}(1, v, n-2) + (d_m(n-1) + d_m(n))/2 \end{cases}"$$

insert $$--\hat{m} = \mathrm{argmin} \begin{cases} D_{m-2}(\ell, v, n-1) + d_{m-1}(n) + d_m(n) \\ D_{m-1}(\ell, v, n-1) + d_m(n) \\ D_{m-1}(\ell, v, n-2) + (d_m(n-1) + d_m(n))/2 \end{cases}--$$

UNITED STATES PATENT AND TRADEMARK OFFICE
CERTIFICATE OF CORRECTION

PATENT NO. : 4,592,086

DATED : May 27, 1986

INVENTOR(S) : Masao Watari et al

It is certified that error appears in the above-identified patent and that said Letters Patent is hereby corrected as shown below:

line 49, delete "$F_m(1, v, n) = F_m(1, v, n)$", insert --$F_m(\ell, v, n) = F_m(\ell, v, n)$--;

Column 20, in the following lines, all occurrences, please change "1" to --$\ell$--;

line 17, 18, 19, 22, 28, 37, 40, 42, 45, 46, 58, 60.

line 51, delete "(1-1, m-1)", insert --($\ell$-1, m-1)--.

Column 21, line 38, delete "$D_m(1, v, n)$ = min", insert

--$D_m(\ell, v, n)$ = min--;

line 64, delete "points n,", insert --points $\hat{n}$,--.

Column 22, line 7, delete "point n s a", insert --point $\hat{n}$ as--.

Column 23, line 30, "$D_m(1, v, n)$ = min", insert

--$D_m(\ell, v, n)$ = min--;

Column 24, line 6, delete "point n", insert --point $\hat{n}$--;
line 27 delete "," after "to" and insert --,-- after "currently".

Signed and Sealed this

Twenty-fifth Day of August, 1987

Attest:

DONALD J. QUIGG

Attesting Officer

Commissioner of Patents and Trademarks